US009857104B2

(12) United States Patent
Lemieux et al.

(10) Patent No.: US 9,857,104 B2
(45) Date of Patent: Jan. 2, 2018

(54) AIR-CYCLE ENVIRONMENTAL CONTROL SYSTEMS AND METHODS FOR AUTOMOTIVE APPLICATIONS

(71) Applicant: CAL POLY CORPORATION, San Luis Obispo, CA (US)

(72) Inventors: Patrick J. E. Lemieux, San Luis Obispo, CA (US); Cyrille Dennis Moore, San Luis Obispo, CA (US); Christopher J. Forster, San Luis Obispo, CA (US)

(73) Assignee: CAL POLY CORPORATION, San Luis Obispo, CA (US)

( * ) Notice: Subject to any disclaimer, the term of this patent is extended or adjusted under 35 U.S.C. 154(b) by 0 days.

(21) Appl. No.: 15/013,985

(22) Filed: Feb. 2, 2016

(65) Prior Publication Data

US 2016/0153684 A1    Jun. 2, 2016

Related U.S. Application Data

(63) Continuation-in-part of application No. 13/710,393, filed on Dec. 10, 2012, now Pat. No. 9,249,998.

(60) Provisional application No. 61/568,611, filed on Dec. 8, 2011.

(51) Int. Cl.
*F25B 9/00* (2006.01)
*B60H 1/32* (2006.01)

(52) U.S. Cl.
CPC ............. *F25B 9/004* (2013.01); *B60H 1/32* (2013.01); *B60H 1/3204* (2013.01)

(58) Field of Classification Search
CPC ............ B64D 13/08; B64D 2013/0618; B64D 2013/0603; B64D 13/06; B60H 1/32; F25B 9/004; F25B 11/02; F25B 2400/14; F25B 29/0412; F25B 9/06; F02B 29/0481; F02B 29/0412; F02B 29/0418
USPC .......................................................... 62/530
See application file for complete search history.

(56) References Cited

U.S. PATENT DOCUMENTS

| 6,158,217 | A | 12/2000 | Wang |
| 6,273,076 | B1 | 8/2001 | Beck |
| 6,283,410 | B1 | 9/2001 | Thompson |
| 6,360,547 | B1 * | 3/2002 | Reznik ................... B29B 17/02 62/87 |
| 2013/0180270 | A1 * | 7/2013 | Lemieux .................. F25B 9/06 62/86 |

* cited by examiner

*Primary Examiner* — Cassey D Bauer
(74) *Attorney, Agent, or Firm* — George B. Leavell

(57) ABSTRACT

An air-cycle machine (ACM) air conditioning system and method, uses a turbocharger to cool cabin air through expansion. The ACM utilizes an unused, excess, compressed air output from another compressor. A compressor provides compressed air to the intake of an internal combustion engine. The unused, excess, compressed air output from another compressor is diverted to and compressed in an ACM compressor. The output of the ACM compressor is cooled in a heat exchanger and then input to an ACM turbine. The ACM turbine expands the output of the heat exchanger to produce expanded, cooled, cabin air. At least a portion of the expanded, cooled, cabin air can be used to cool an intake charge for the internal combustion engine and/or to cool a passenger cabin and/or other enclosed, refrigerated space.

14 Claims, 16 Drawing Sheets

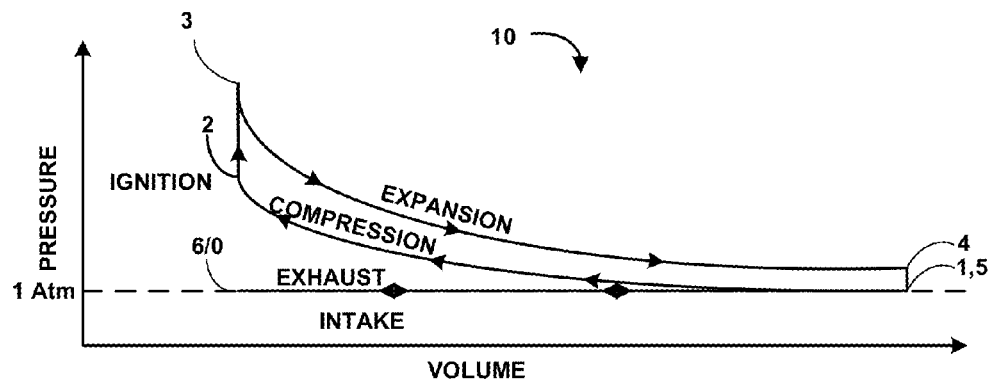
FIG. 1.1
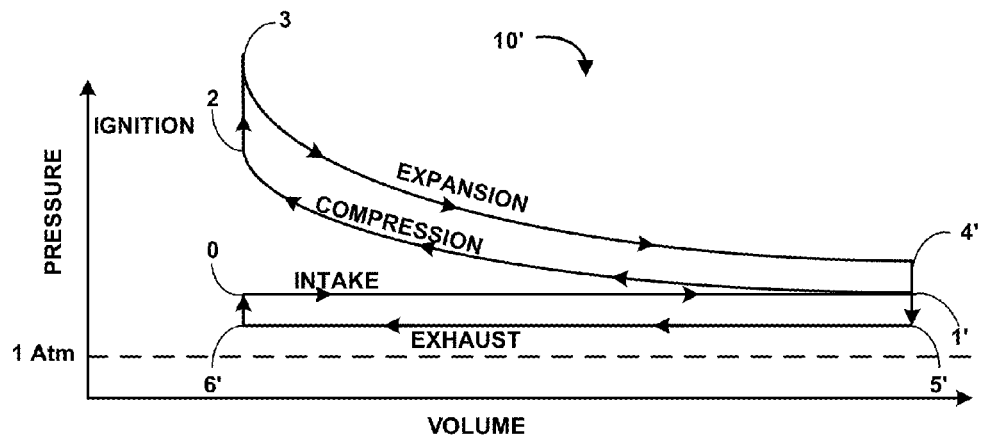
FIG. 1.2
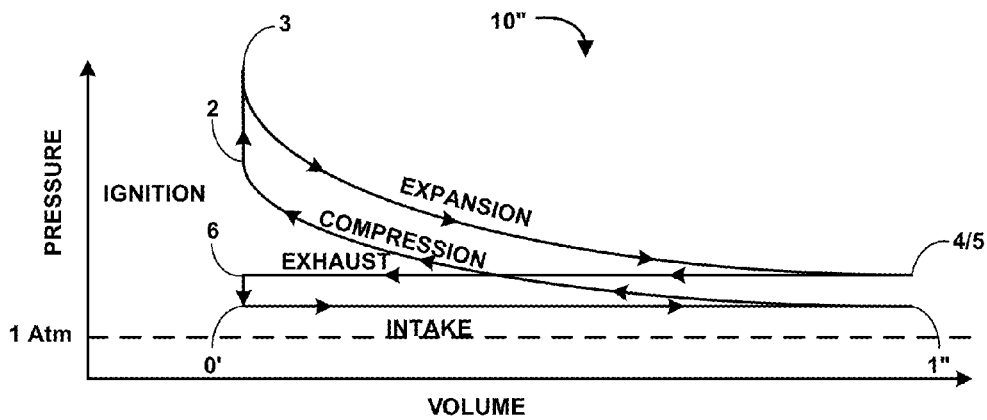
FIG. 1.3

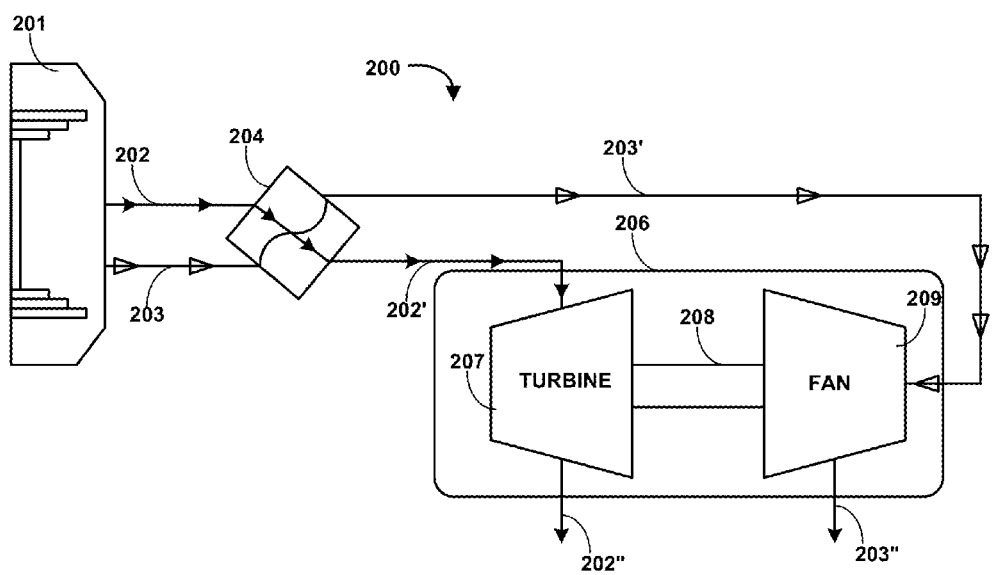
FIG. 2.1
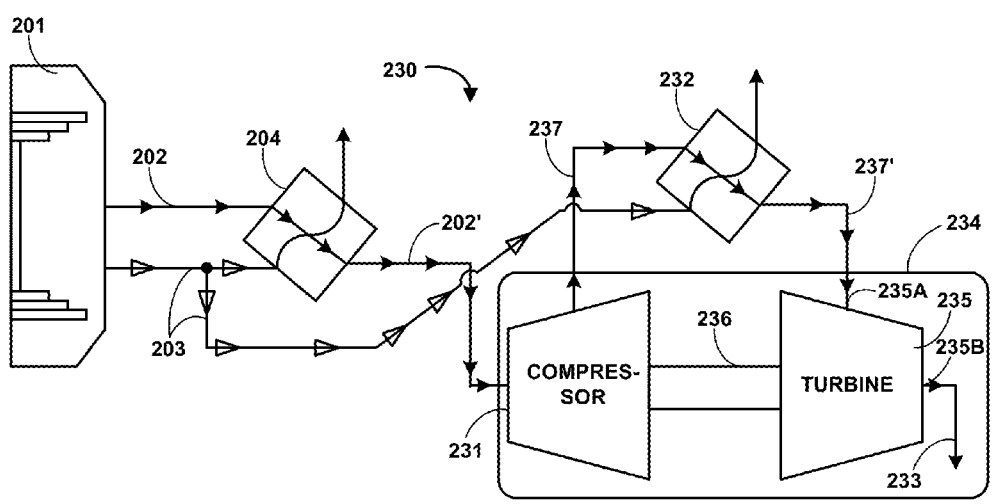
FIG. 2.2

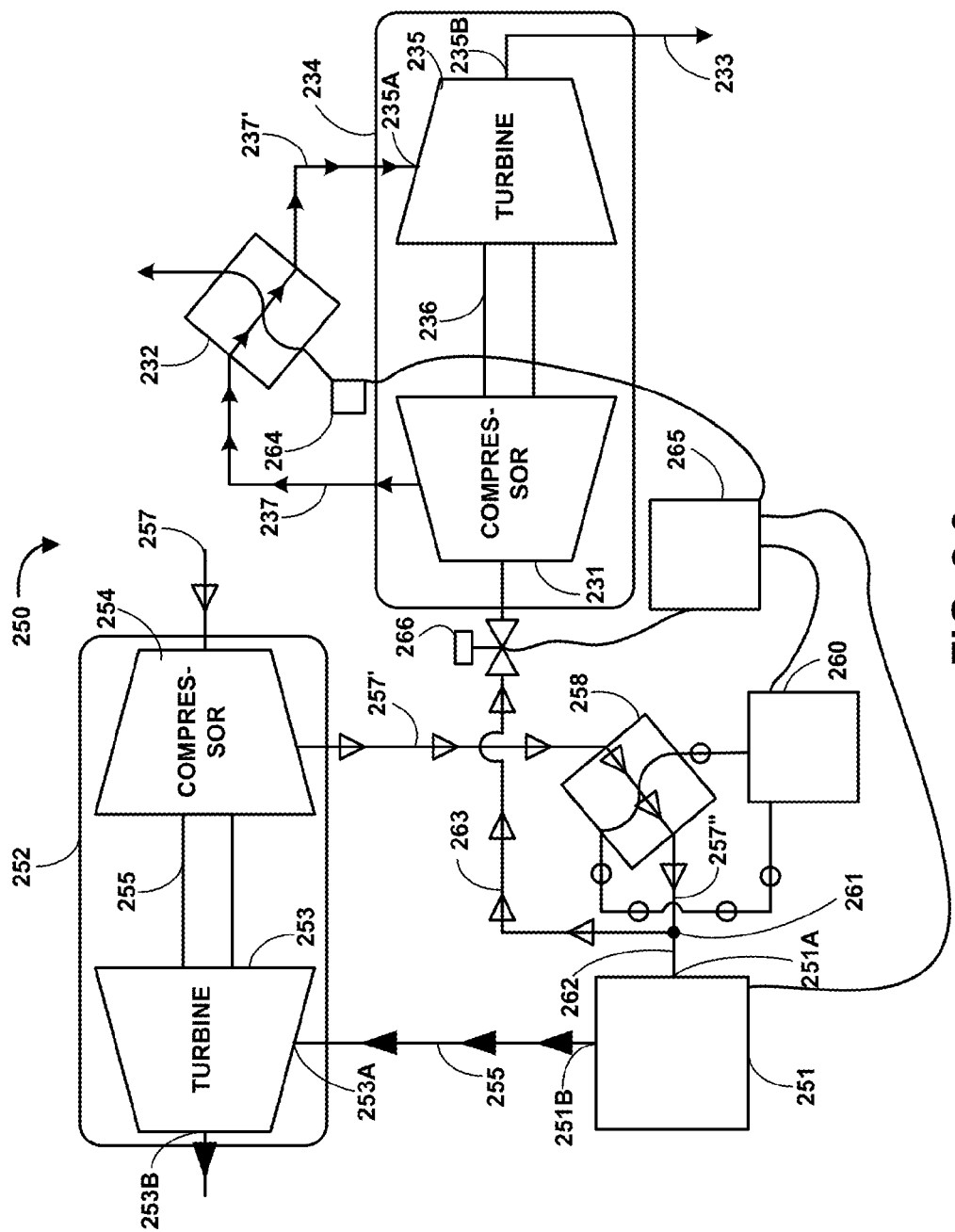
FIG. 2.3

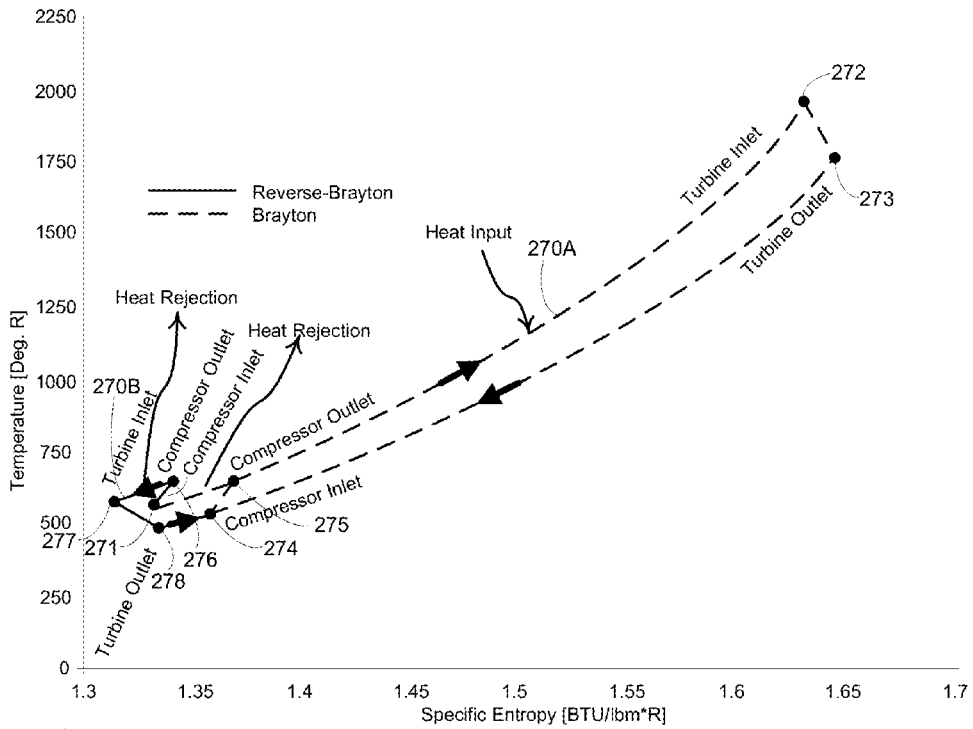
FIG. 2.4
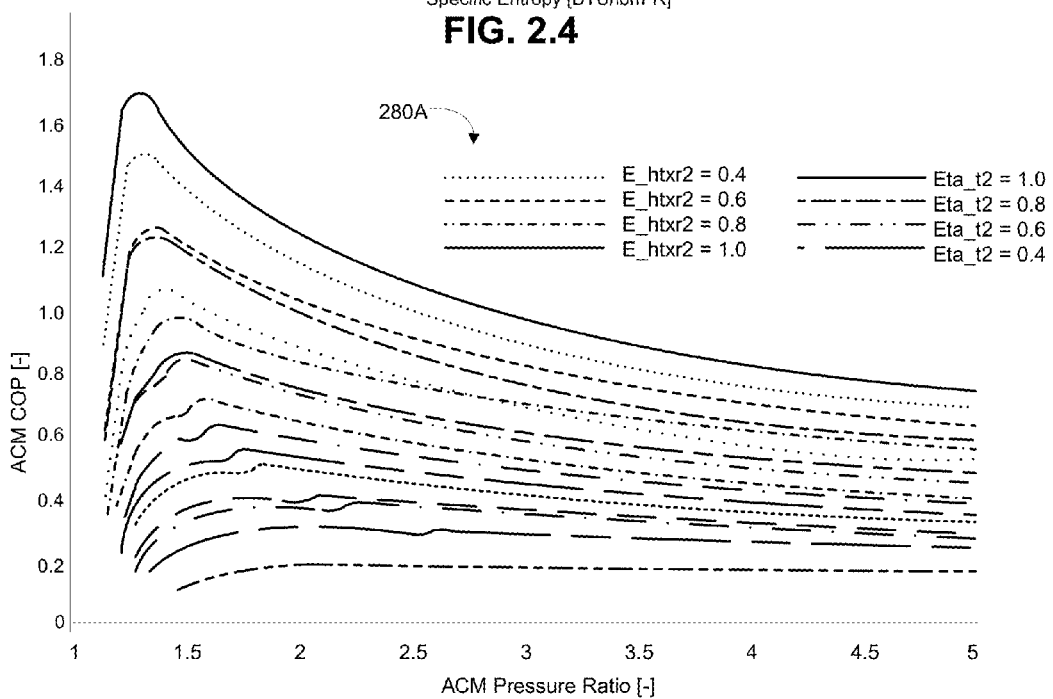
FIG. 2.5

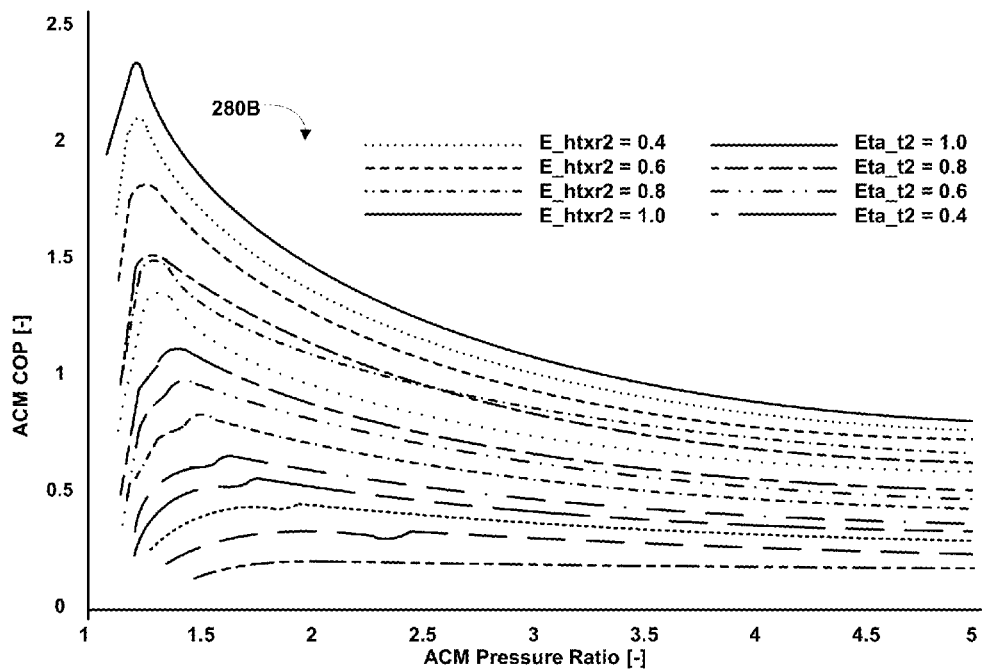
FIG. 2.6
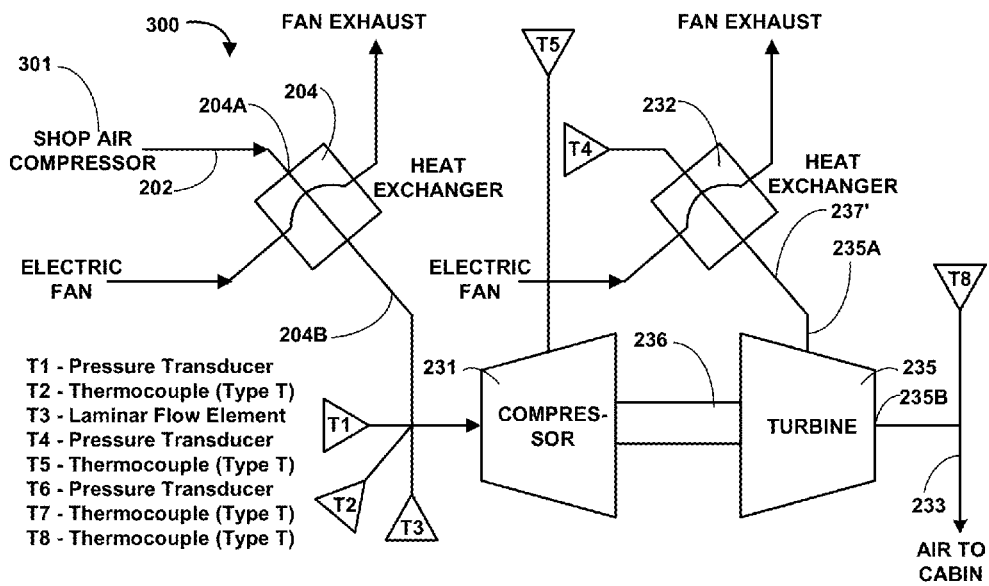
FIG. 3.1

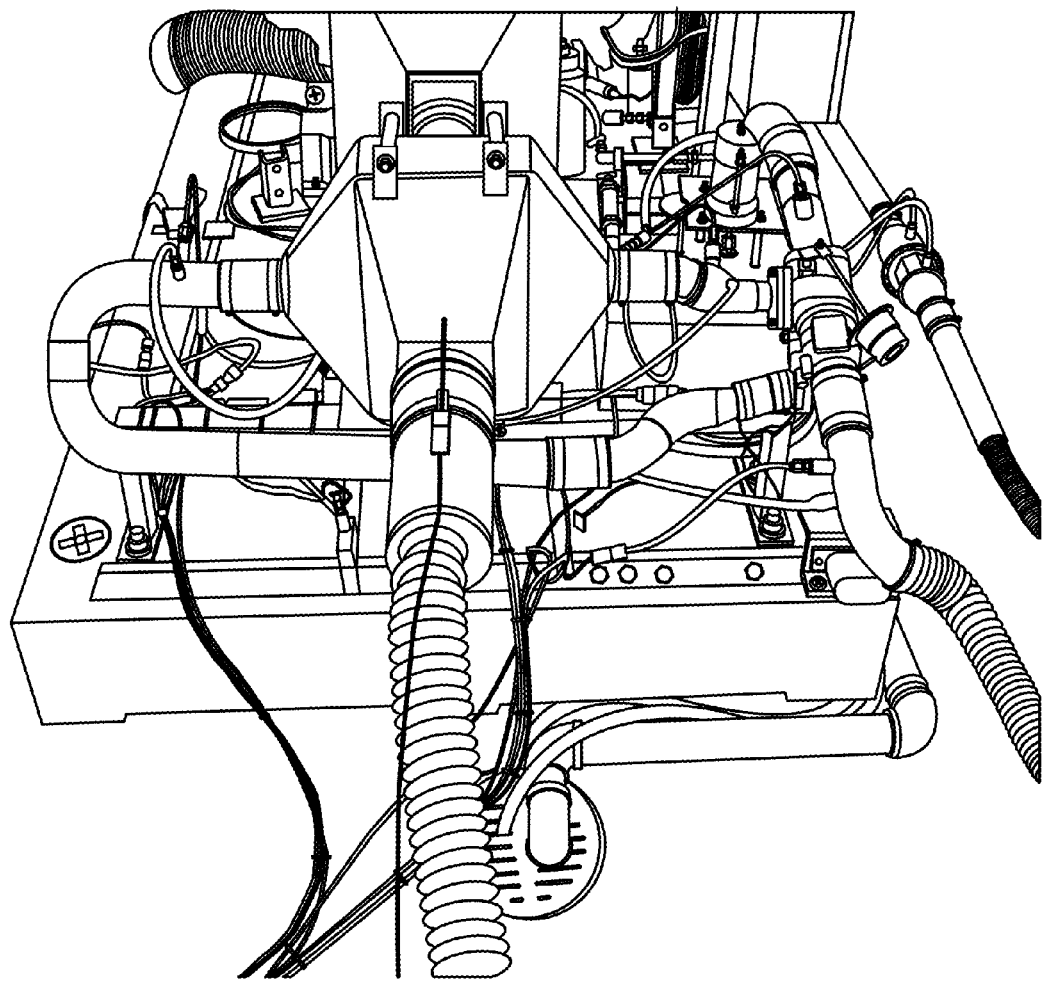
FIG. 3.2

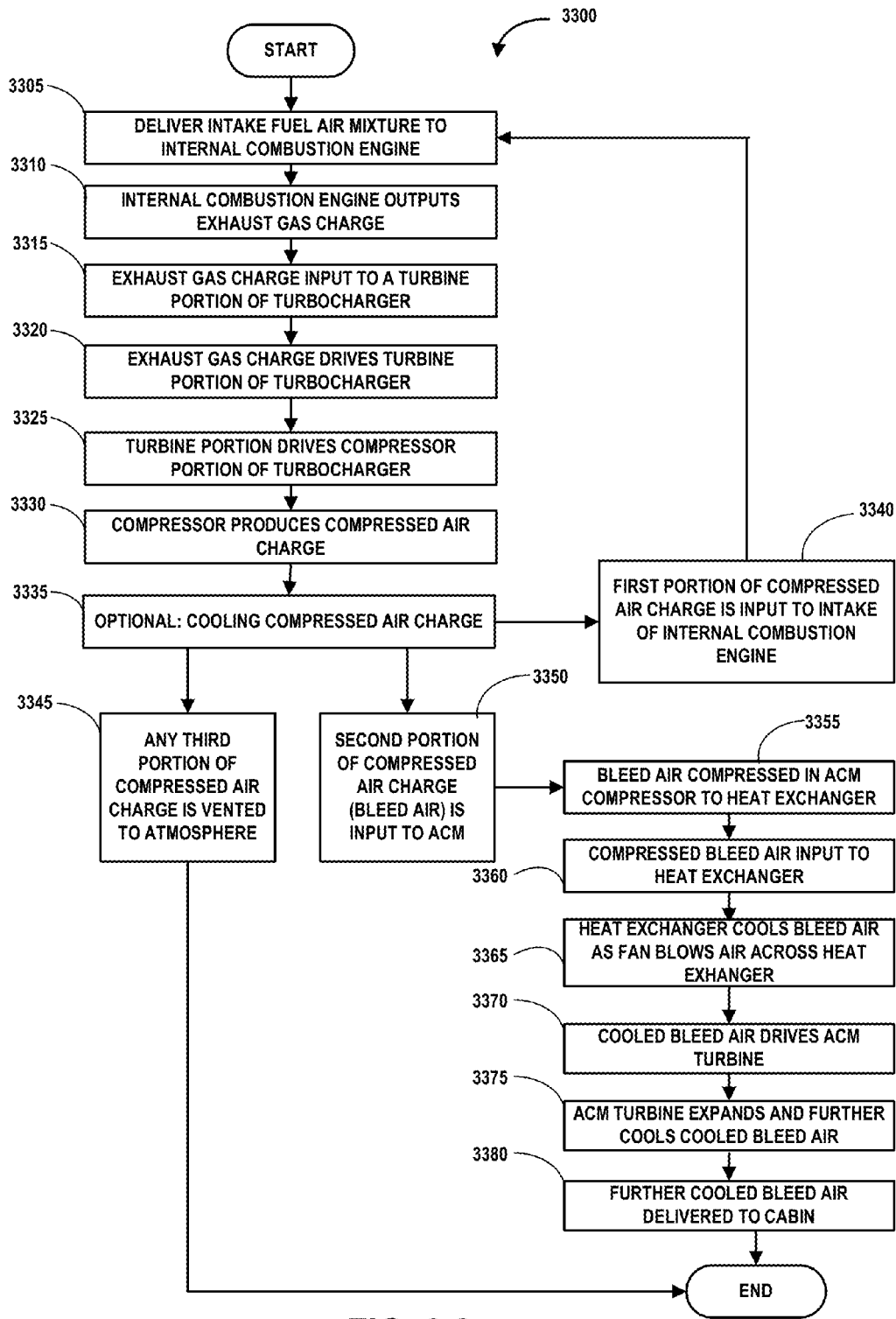
FIG. 3.3

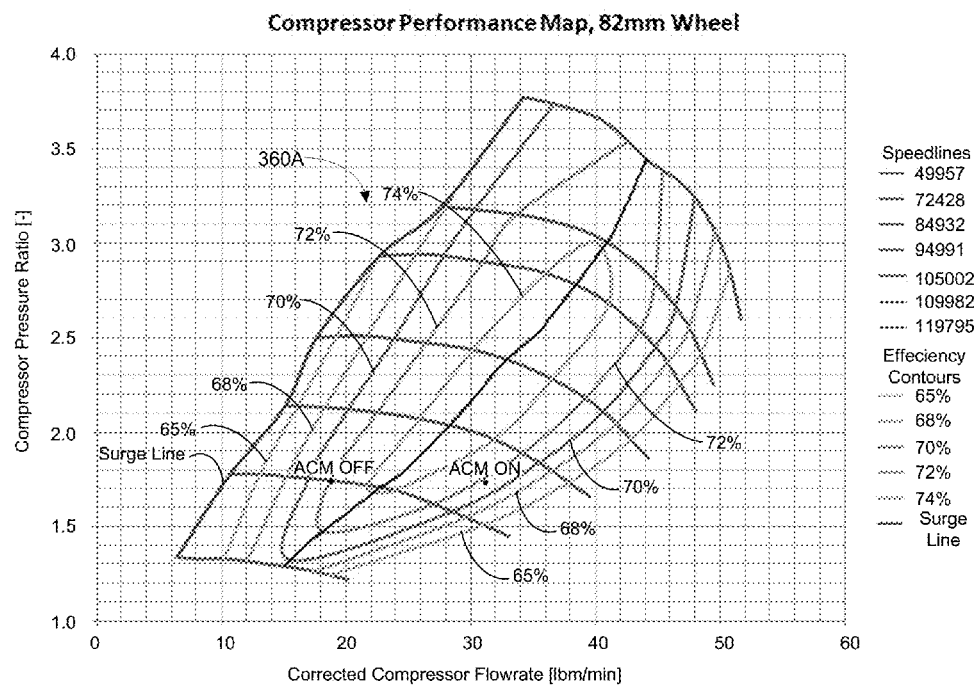
FIG. 3.4
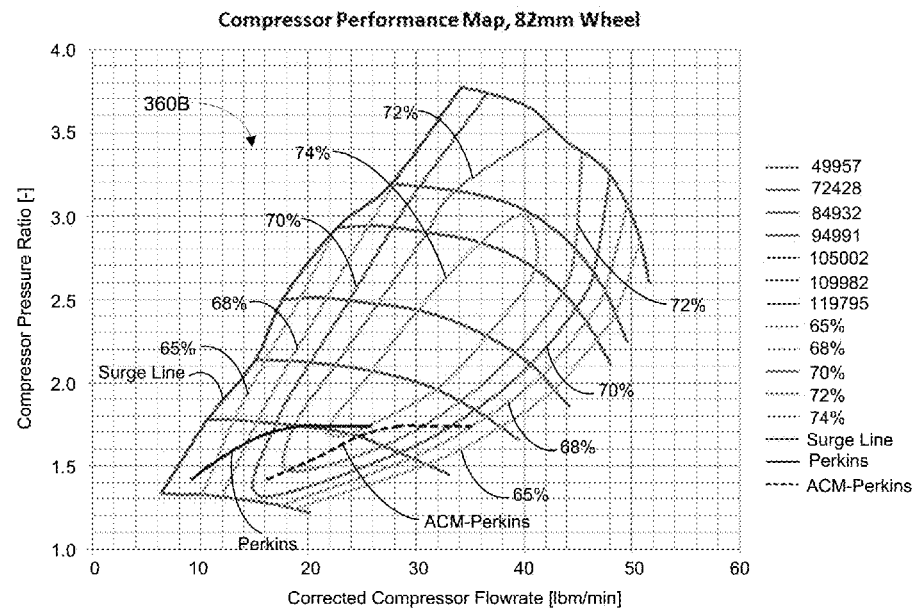
FIG. 3.5

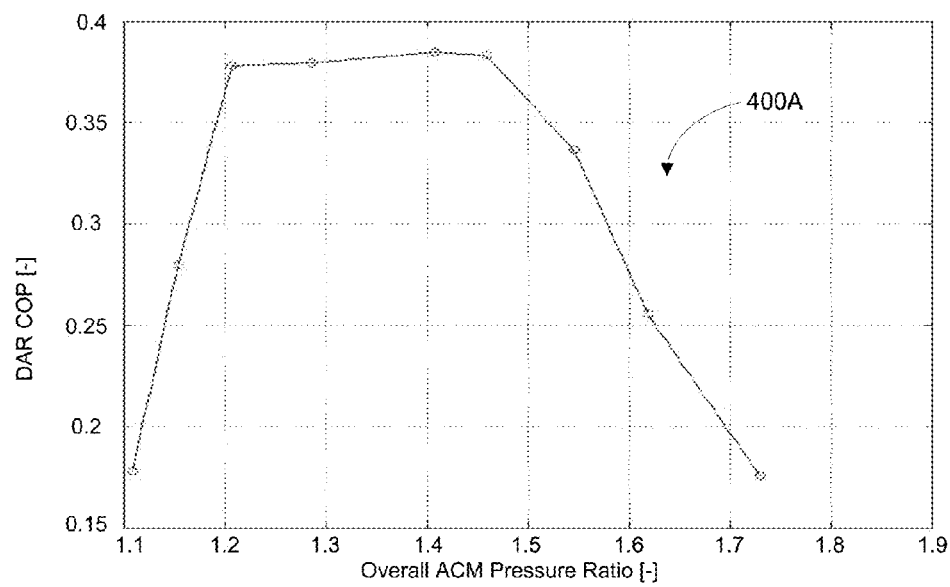
FIG. 4.1
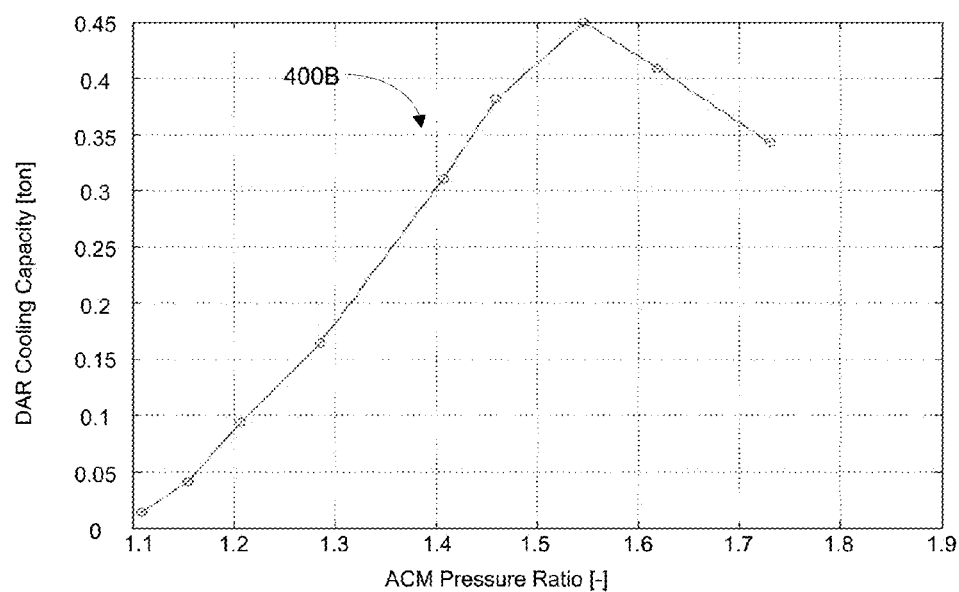
FIG. 4.2

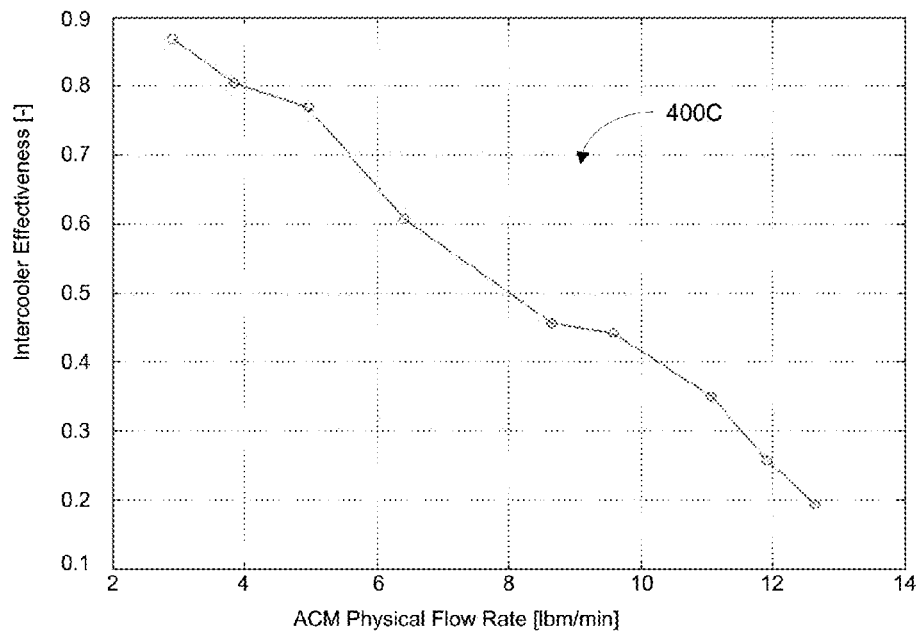
FIG. 4.3
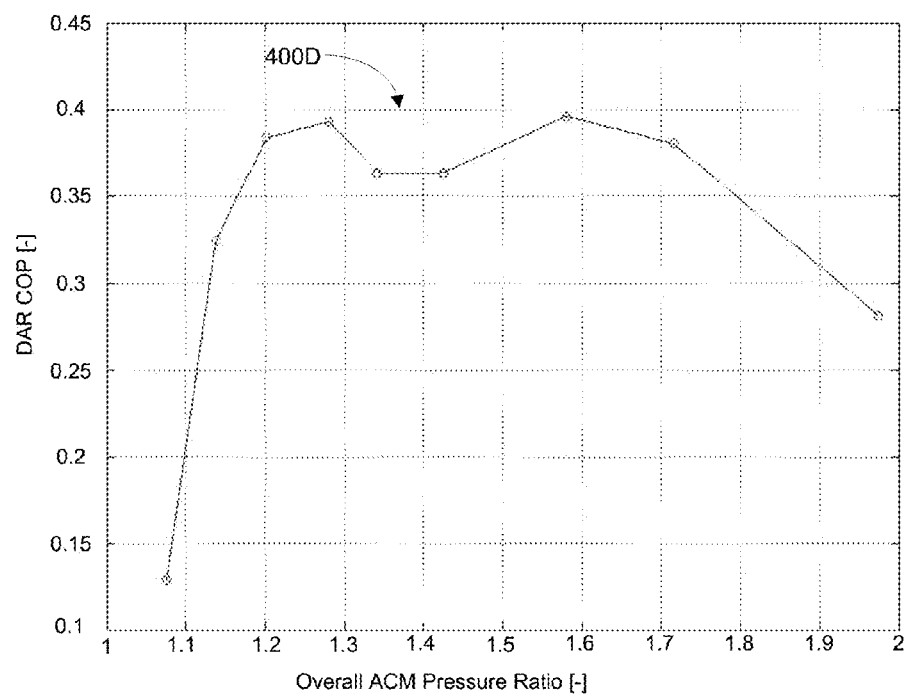
FIG. 4.4

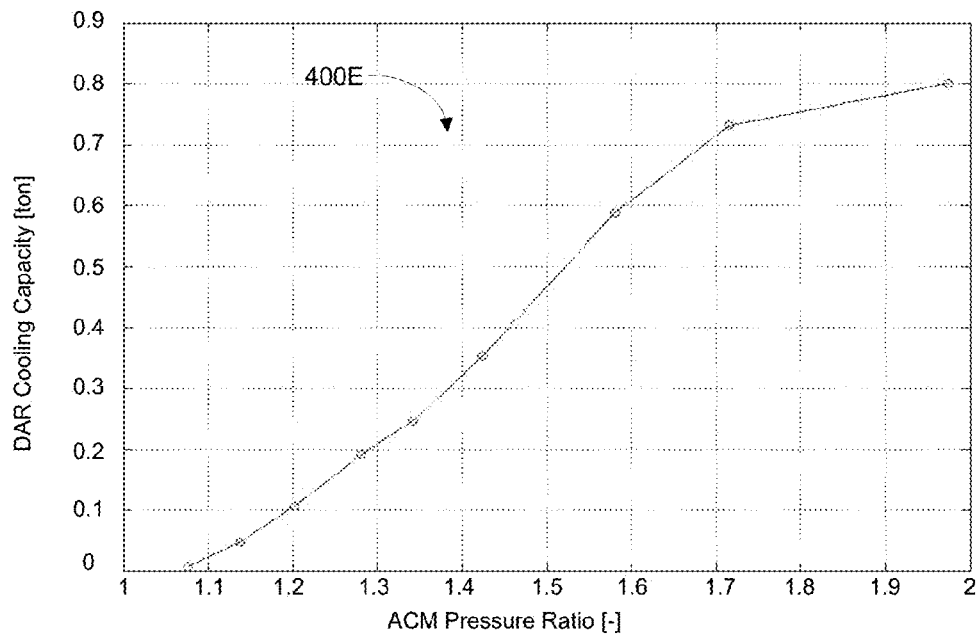
FIG. 4.5
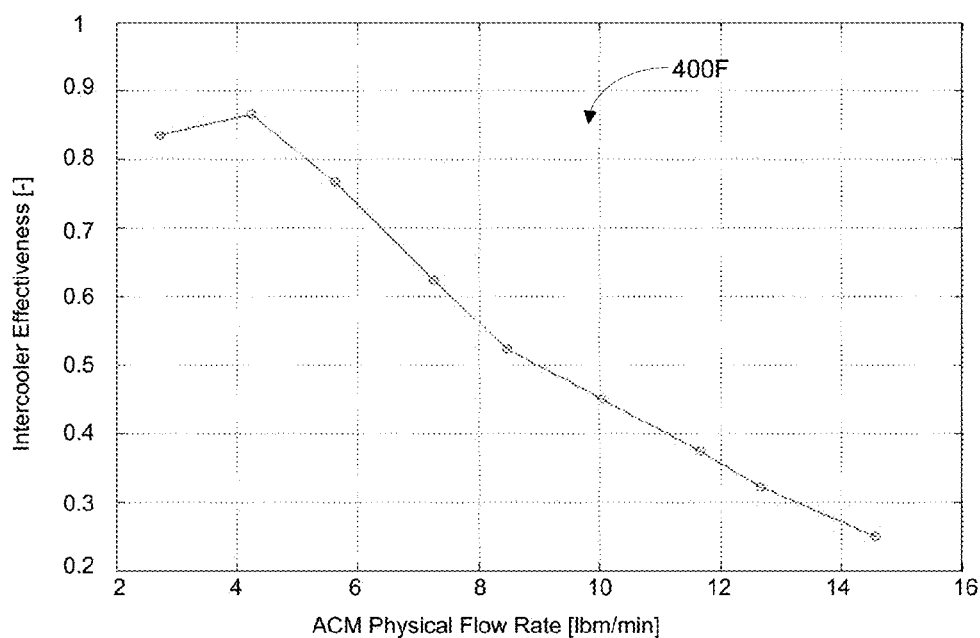
FIG. 4.6

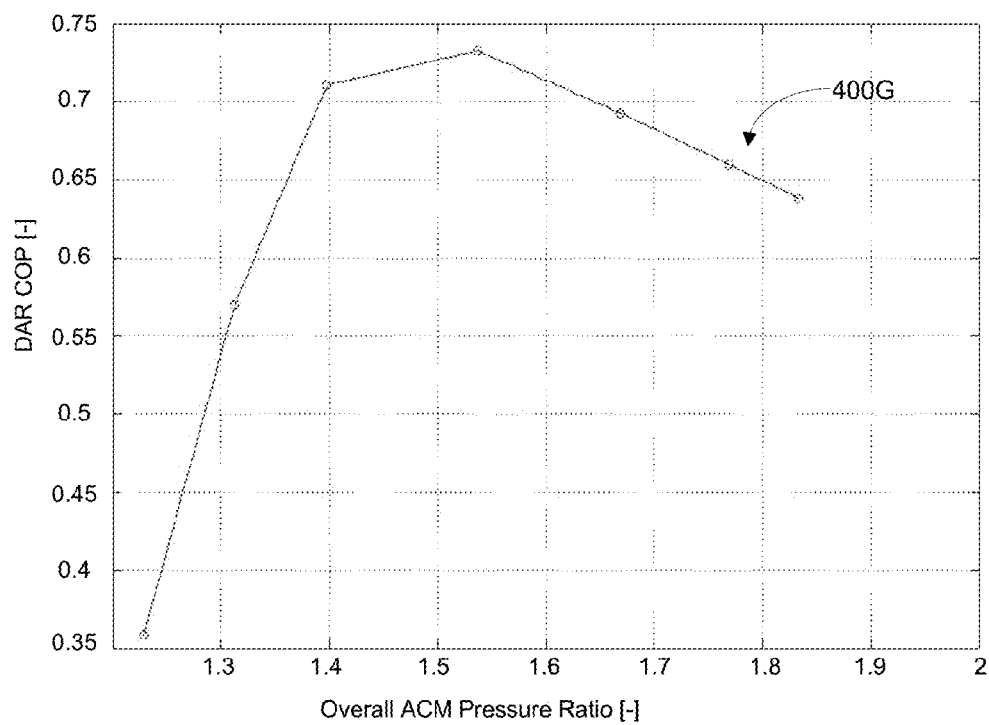
FIG. 4.7
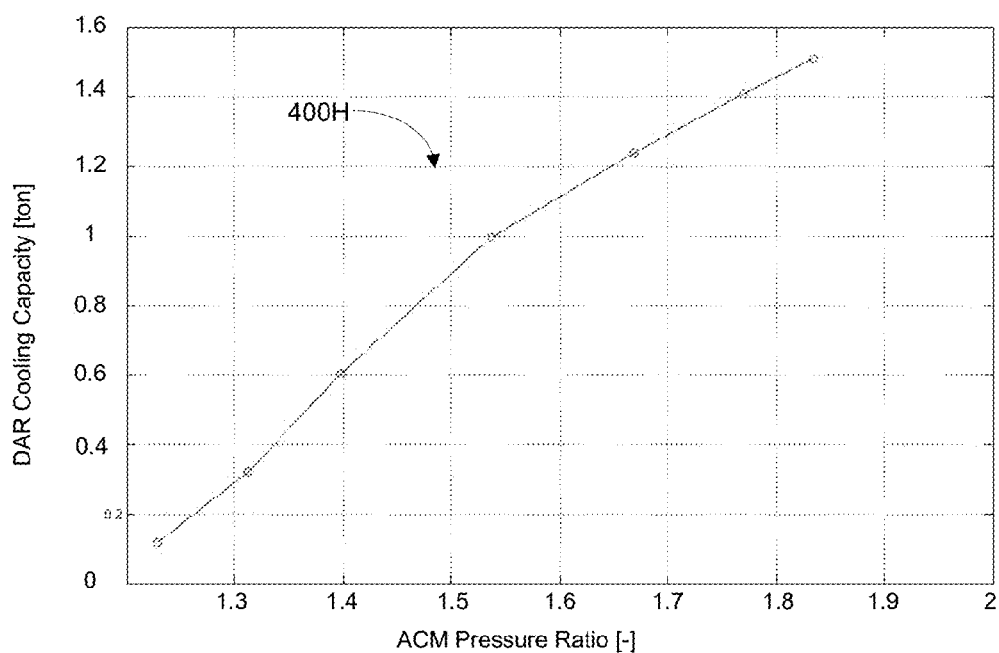
FIG. 4.8

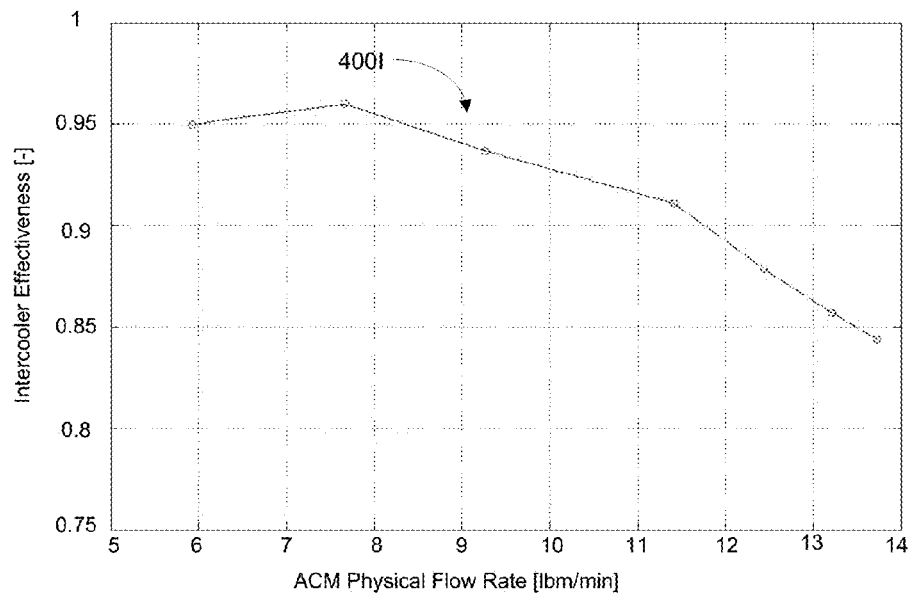
FIG. 4.9
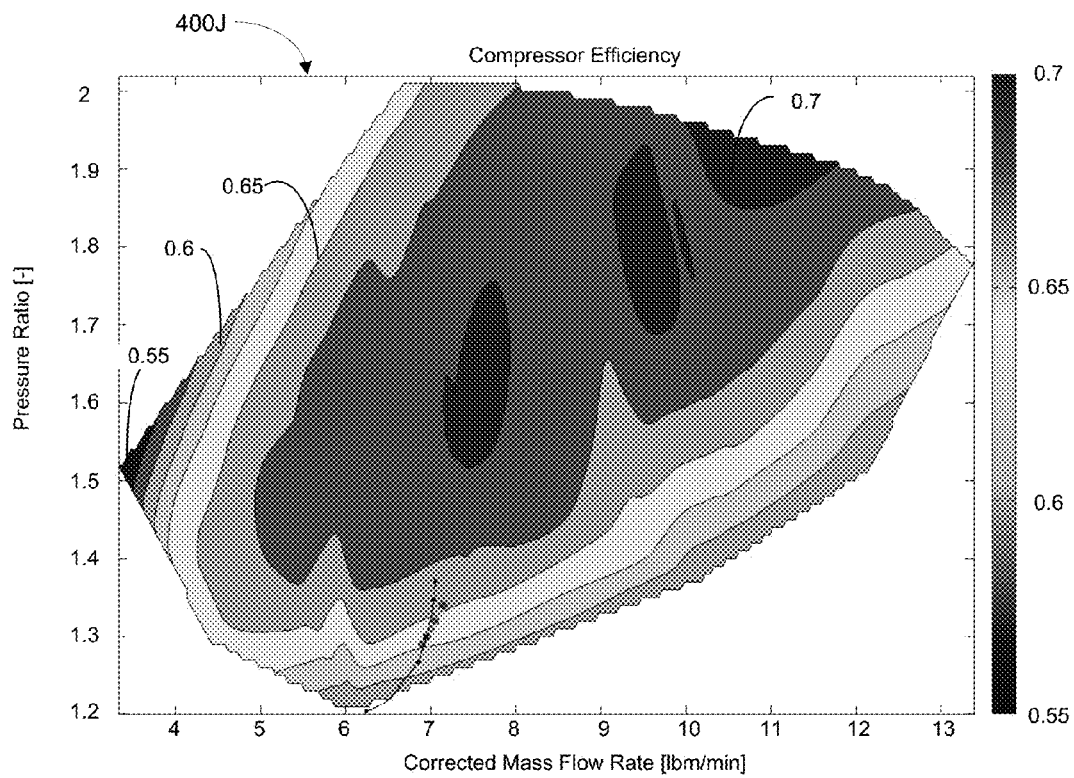
FIG. 4.10

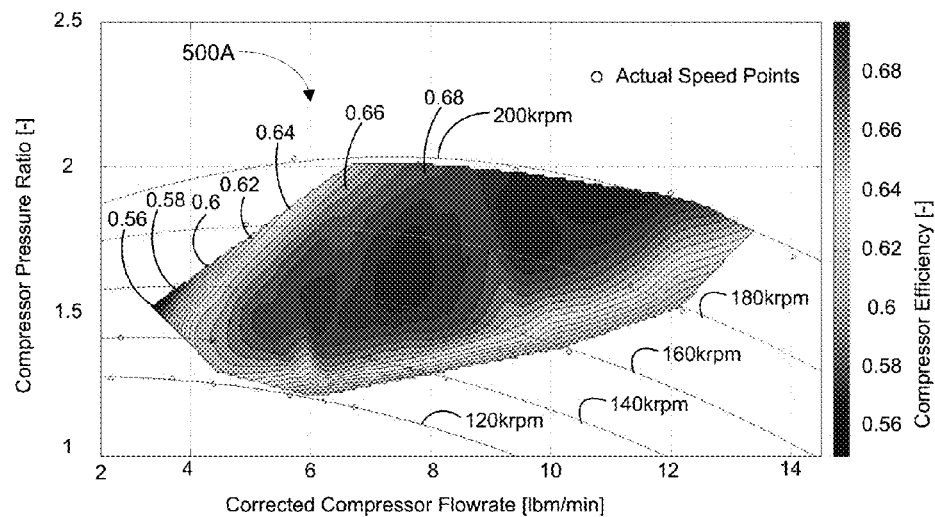
FIG. 5.1
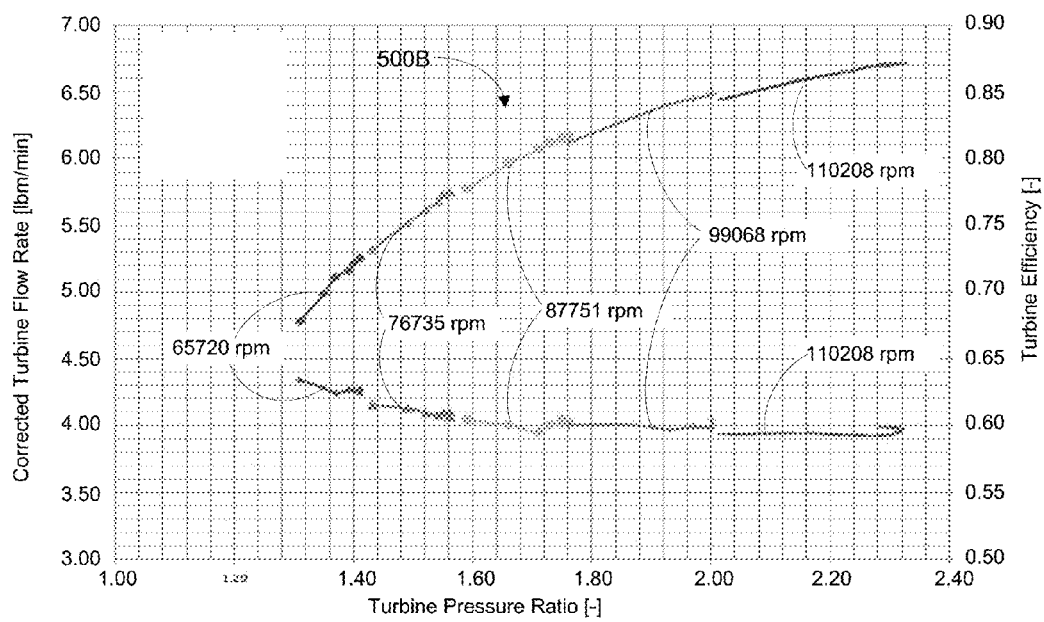
FIG. 5.2

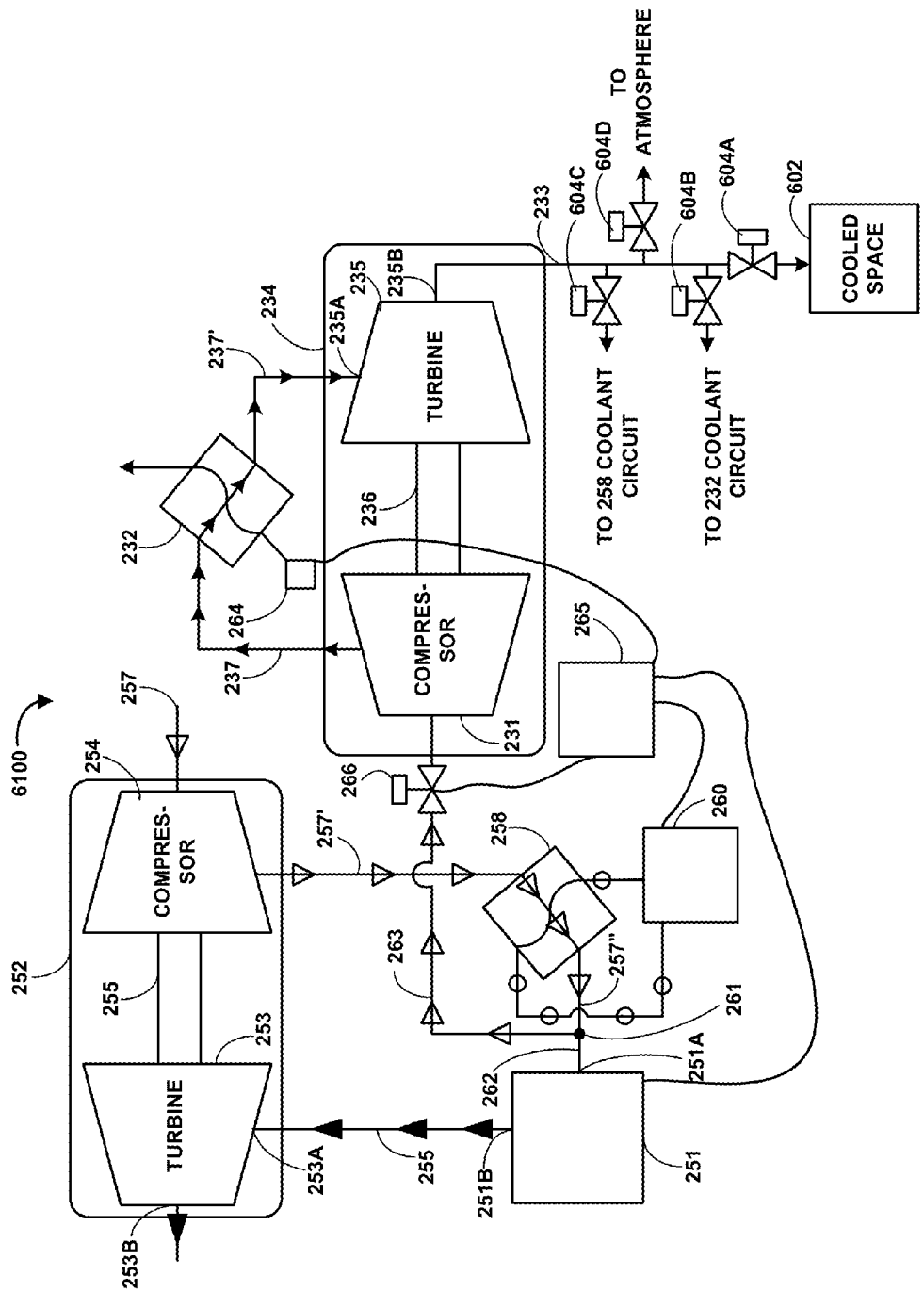
FIG. 6.1

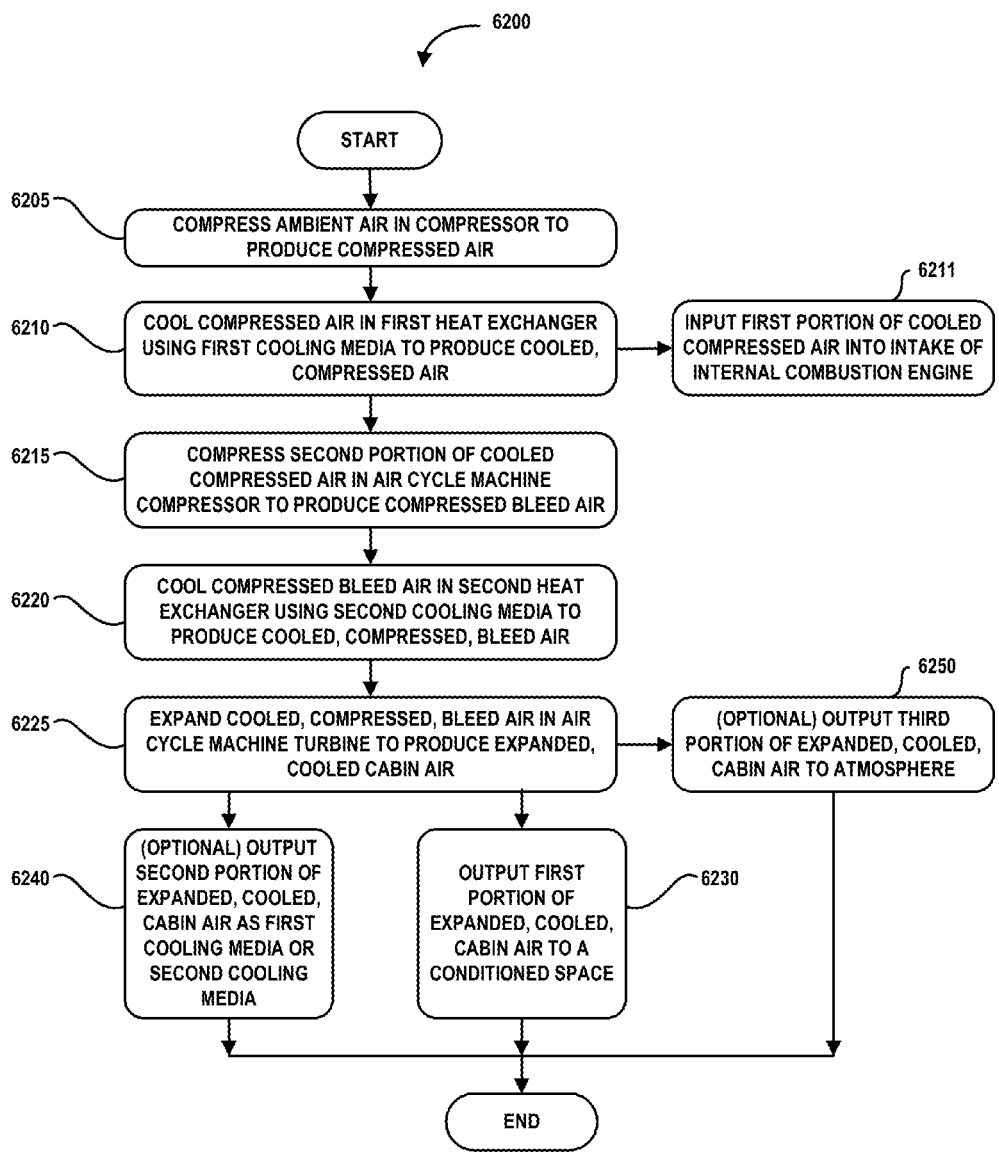
FIG. 6.2

AIR-CYCLE ENVIRONMENTAL CONTROL SYSTEMS AND METHODS FOR AUTOMOTIVE APPLICATIONS

CROSS REFERENCE TO RELATED APPLICATIONS

This application is a continuation-in-part of and claims priority from U.S. patent application Ser. No. 13/710,393 filed on Dec. 10, 2012 and entitled "Air-Cycle Environmental Control Systems and Methods for Automotive Applications," which is incorporated herein by reference in its entirety for all purposes. This application and U.S. patent application Ser. No. 13/710,393 claim priority from U.S. Provisional Patent Application No. 61/568,611 filed on Dec. 8, 2011 and entitled "Air-Cycle Environmental Control Systems and Methods for Automotive Applications," which is incorporated herein by reference in its entirety for all purposes.

Automotive air conditioning systems are in the process of undergoing some major changes due to environmental concerns. The new changes are to prevent global warming, in addition to ozone depletion. These changes tend to have negative impacts on air conditioning performance due to a shift in refrigerant selection criteria, from maximum coefficient of performance (COP) to lifecycle environmental impact of the system. The new criteria considers designs that may have lower COP but may still have less overall negative impact on the environment throughout the lifecycle of the system. Some of the other considerations in selecting a refrigerant are the system weight, manufacturing costs, refrigerant toxicity, and flammability effects of potential leaks. Looking into the future, additional changes to automotive air conditioning systems are likely, and use of a refrigerant that is naturally available and does not need to be retrofitted is convenient.

SUMMARY

Broadly speaking, the disclosed embodiments fill these needs by providing an air cycle machine and a method for operating an air cycle machine. It should be appreciated that the disclosed embodiments can be implemented in numerous ways, including as a process, an apparatus, a system, computer readable media, or a device. Several inventive embodiments are described below.

One embodiment provides a method of producing cooled air. The method includes delivering a second portion of a compressed air to an air cycle machine, further compressing the second portion of the compressed air in an air cycle machine compressor, cooling the further compressed air, expanding the cooled, further compressed air in an air cycle machine turbine and outputting an expanded, cooled air from the air cycle machine turbine.

Delivering the second portion of the compressed air can include generating the second portion of the compressed air in a first compressor. A first portion of the compressed air can be delivered from the first compressor to an intake of an internal combustion engine. The first compressor can be included in a first turbocharger. Delivering the first portion of the compressed air from the first compressor to the intake of the internal combustion engine can also include delivering an exhaust charge from the internal combustion engine to a first turbocharger turbine, the first turbocharger turbine rotatably coupled to the first turbocharger compressor.

Delivering the first portion of the compressed air from the first compressor to the intake of the internal combustion engine can also include cooling at least one of the first portion of the compressed air or the second portion of the compressed air. Delivering the second portion of the compressed air to the air cycle machine can include cooling the second portion of the compressed air.

The first compressor can be a super charger. The first compressor can be a compressor portion of a turbine engine. The method can also include expanding a third portion of the compressed air and cooling at least the first portion or the second portion of the compressed air with the expanded third portion of the compressed air.

Another embodiment provides an air cycle machine. The air cycle machine includes a first compressor, a first heat exchanger, an air cycle machine compressor, a second heat exchanger and an air cycle machine turbine. The first compressor having a first compressor input and a first compressor output. The first heat exchanger including a first coolant circuit and a first cooling circuit having a first cooling circuit input and a first cooling circuit output, the first cooling circuit input coupled to the first compressor output. The air cycle machine compressor having a second compressor input and a second compressor output, the second compressor input coupled to the first cooling circuit output. The second heat exchanger including a second coolant circuit and a second cooling circuit having a second cooling circuit input and a second cooling circuit output, the second cooling circuit input coupled to the second compressor output. The air cycle machine turbine mechanically coupled to the air cycle machine compressor, the air cycle machine turbine having a second turbine input and a second turbine output; the second turbine input coupled to the second cooling circuit output.

The system can also include a first cooling media source coupled to the first coolant circuit for cooling the first heat exchanger. The system can also include a second cooling media source coupled to the second coolant circuit for cooling the second heat exchanger. The second compressor input can be coupled to the first cooling circuit output through a flow control valve. The system can also include a controller coupled to the flow control valve.

Another embodiment provides an air cycle machine. The air cycle machine including a first turbocharger, a first heat exchanger, an intake of an internal combustion engine, an air cycle machine compressor, a second heat exchanger and an air cycle machine turbine. The first turbocharger including a first turbine, the first turbine having first turbine input coupled to an exhaust of the internal combustion engine. The first turbine mechanically coupled to the first compressor, the first compressor including a first compressor input and a first compressor output. The first heat exchanger including a first coolant circuit and a first cooling circuit having a first cooling circuit input and a first cooling circuit output, the first cooling circuit input coupled to the first compressor output. The intake of the internal combustion engine is coupled to the coupled to the first cooling circuit output. The air cycle machine compressor having a second compressor input and a second compressor output, the second compressor input coupled to the first cooling circuit output through a flow control valve. The second heat exchanger including a second coolant circuit and a second cooling circuit having a second cooling circuit input and a second cooling circuit output, the second cooling circuit input coupled to the second compressor output. The air cycle machine turbine is mechanically coupled to the air cycle machine compressor, the air cycle machine turbine having a second turbine input and a second turbine output, the second turbine input coupled to the second cooling circuit output.

Other aspects and advantages of the disclosed embodiments will become apparent from the following detailed description, taken in conjunction with the accompanying drawings, illustrating by way of example the principles of the disclosed embodiments.

BRIEF DESCRIPTION OF THE DRAWINGS

The disclosed embodiments will be readily understood by the following detailed description in conjunction with the accompanying drawings.

FIG. 1.1 is a pressure/volume graph of a typical normally aspirated, spark ignition, four-stroke internal combustion engine cycle.

FIG. 1.2 is a pressure/volume graph of a typical turbocharged four-stroke internal combustion engine cycle.

FIG. 1.3 is a pressure/volume graph of a turbocharged four-stroke internal combustion engine cycle with a bleed air output, for implementing embodiments of the present disclosure.

FIG. 2.1 is a schematic of a simple air cycle machine system, for implementing embodiments of the present disclosure.

FIG. 2.2 is a schematic of a bootstrap air cycle machine system, for implementing embodiments of the present disclosure.

FIG. 2.3 is a schematic of an internal combustion engine mounted two-wheel bootstrap air cycle machine system, for implementing embodiments of the present disclosure.

FIG. 2.4 is a graph of a Brayton cycle and a graph of a Reverse-Brayton cycle, for implementing embodiments of the present disclosure.

FIGS. 2.5 and 2.6 are graphs of parametric studies of air cycle machine component efficiencies, for implementing embodiments of the present disclosure.

FIG. 3.1 shows a schematic of a compressed air source powered air cycle machine system, for implementing embodiments of the present disclosure.

FIG. 3.2 is a photo of the compressed air source powered air cycle machine system, for implementing embodiments of the present disclosure.

FIG. 3.3 is a flowchart of the on-engine air cycle machine configuration operations, for implementing embodiments of the present disclosure.

FIG. 3.4 is a graph of the primary engine compressor matching process with an engine operating point of 1600 rpm and full load, for implementing embodiments of the present disclosure.

FIG. 3.5 is a graph of the primary engine compressor match with the Perkins diesel boost curve and the target boost curve with the air cycle machine operating, for implementing embodiments of the present disclosure.

FIGS. 4.1 and 4.2 are graphs of the air cycle machine performance, for implementing embodiments of the present disclosure.

FIG. 4.3 is a graph of the primary heat exchanger performance, for implementing embodiments of the present disclosure.

FIGS. 4.4 and 4.5 are graphs of the useful operating range of the air cycle machine, for implementing embodiments of the present disclosure.

FIG. 4.6 is a graph of the heat exchanger effectiveness, for implementing embodiments of the present disclosure.

FIGS. 4.7 and 4.8 are graphs of the heat exchanger performance increase improved both air cycle machine COP and DAR cooling capacity, for implementing embodiments of the present disclosure.

FIG. 4.9 is a graph of the increase in heat exchanger effectiveness, for implementing embodiments of the present disclosure.

FIG. 4.10 is a graph of the results of the compressor operating points comparison, for implementing embodiments of the present disclosure.

FIG. 5.1 is a graph of a GT1244 compressor performance map, for implementing embodiments of the present disclosure.

FIG. 5.2 is a graph of a GT1244 turbine performance map, for implementing embodiments of the present disclosure.

FIG. 6.1 is a schematic of an internal combustion engine mounted two-wheel bootstrap air cycle machine system, for implementing embodiments of the present disclosure.

FIG. 6.2 is a flowchart of the method operation of the two-wheel bootstrap air cycle machine system, for implementing embodiments of the present disclosure.

DETAILED DESCRIPTION

Several exemplary embodiments for an air cycle machine will now be described. It will be apparent to those skilled in the art that the disclosed embodiments may be practiced without some or all of the specific details set forth herein.

Air-cycle machines (ACM) conveniently use air as the refrigerant and have the potential to provide convenient air conditioning for high performance vehicles, where weight is at a premium. An air cycle machine includes an air cycle machine compressor, a heat exchanger, and an air cycle machine turbine which is supplied with pressurized air. The main components of an air-cycle cooling system are the compression process (in air cycle machine compressor), heat removal (in the heat exchanger), and controlled expansion (in the air cycle machine turbine). The cool air from the air cycle machine turbine outlet can be routed directly into the passenger cabin or other cooled air consumer (e.g., cargo refrigeration).

In racing applications, air conditioning is a secondary consideration in vehicle design, and often not used due to weight and power requirements. Any amount of cooling that can be provided without loss in engine performance and minimal weight increase is considered to be an improvement. A bleed-air control configuration is best-suited to racing applications because the amount of cooling required is not set, any cooling provided is beneficial. The bleed-air configuration uses a forced-induction system as the primary source of compressed air for the Reverse Brayton Cycle to operate. This configuration will work with either a supercharged or turbocharged system. The turbocharged system is preferred to minimize the parasitic power loss on the engine caused by the air cycle machine operation. An air cycle machine can also be useful in aviation applications where excess power is available and system weight important.

In a typical turbocharged system compressor outlet pressure is controlled by waste gating. Waste-gating allows a portion of the exhaust charge to bypass the turbine stage thus limiting the amount of energy input to the turbocharger to limit compressor outlet pressure. As an alternative to waste-gating, the compressor outlet pressure can be limited by bleeding a portion of the output of the turbocharger's compressor. This bleed air can be input to the air cycle machine. This reduces the impact on power consumption from the engine because the power would have gone to waste if not used for cooling.

FIG. 1.1 is a pressure/volume graph 10 of a typical normally aspirated, spark ignition, four-stroke internal combustion engine cycle. Pressure in a cylinder in a four-stroke internal combustion engine is shown on the vertical axis. Volume in a cylinder in a four-stroke internal combustion engine is shown in the horizontal axis. A 1 atmosphere pressure line is provided for reference.

Starting at point 0, the intake valves open with the piston in the cylinder at a top center position and the volume of the cylinder is at a minimum. As the piston moves from top center at point 0 to bottom center at point 1, an intake charge of fuel and air is drawn into the cylinder at about 1 atmosphere of pressure in an intake stroke. At point 1, the piston is at bottom center where the volume of the cylinder reaches its maximum and the intake valves close.

In a compression stroke, the piston moves from bottom center at point 1 to top center at point 2 as the fuel and air is compressed in the cylinder (e.g., pressure increases) because the intake and exhaust valves are closed and the volume is reduced. At point 2, the volume of the cylinder is again at a minimum.

An ignition of the compressed fuel and air also occurs at point 2. The ignition causes the compressed fuel and air to burn and generate a large pressure wave to increase the pressure in the cylinder to its peak value at point 3.

The piston is driven from top center at point 3 to bottom center at point 4 by the peak pressure during an expansion stroke. The volume of the cylinder increases from minimum to maximum during the expansion stroke. The exhaust valve opens at point 4 to open the cylinder to atmospheric pressure. The cylinder pressure thus drops from point 4 to point 5 while the piston is at bottom center. Point 5 coincides with point 1 described above.

The piston moves from bottom center at point 5 to top center at point 6 to force the exhaust gases out of the cylinder in an exhaust stroke. The volume of the cylinder decreases from maximum to minimum during the exhaust stroke. Point 6 and point 0 coincide and the four stroke cycle repeats.

FIG. 1.2 is a pressure/volume graph 10' of a typical turbocharged four-stroke internal combustion engine cycle. The pressure/volume graph 10' of a typical turbocharged four-stroke internal combustion engine cycle is substantially similar to the pressure/volume graph 10 of a typical normally aspirated four-stroke internal combustion engine cycle described above except the baseline operating pressure is shifted to higher than one atmosphere.

Starting at point 0, the intake valves open with the piston in the cylinder at a top center position and the volume of the cylinder is at a minimum. As the piston moves from top center at point 0 to bottom center at point 1', an intake charge of fuel and air is forced into the cylinder at the output pressure of the turbocharger compressor, usually between about 1 atmosphere and about 4 or more atmospheres in the intake stroke. At point 1', the piston is at bottom center where the volume of the cylinder reaches its maximum and the intake valves close.

In a compression stroke, the piston moves from bottom center at point 1' to top center at point 2 as the fuel and air is compressed in the cylinder (e.g., pressure increases) because the intake and exhaust valves are closed and the volume is reduced. At point 2, the volume of the cylinder is again at a minimum.

An ignition of the compressed fuel and air also occurs at point 2. The ignition causes the compressed fuel and air to burn and generate a large pressure wave to increase the pressure in the cylinder to its peak value at point 3.

The piston is driven from top center at point 3 to bottom center at point 4' by the peak pressure during an expansion stroke. The volume of the cylinder increases from minimum to maximum during the expansion stroke. The exhaust valve opens at point 4 to open the cylinder to a lower pressure, usually slightly above atmospheric pressure, 5'. Note that points 5' and 1' no longer coincide as described in FIG. 1.1 above due to the vertical shift upward in pressure caused by the increase in intake pressure to above atmospheric pressure.

The piston moves from bottom center at point 5' to top center at point 6' to force the exhaust gases out of the cylinder in an exhaust stroke. The volume of the cylinder decreases from maximum to minimum during the exhaust stroke. Point 6' and point 0 no longer coincide due to the increased intake pressure when the intake valve opens and the turbocharged four stroke cycle repeats.

FIG. 1.3 is a pressure/volume graph 10" of a turbocharged four-stroke internal combustion engine cycle with a bleed air output, for implementing embodiments of the present disclosure. The pressure/volume graph 10" of a turbocharged four-stroke internal combustion engine cycle with a bleed air output is substantially similar to the pressure/volume graph 10' of a turbocharged four-stroke internal combustion engine cycle described above except that the respective pressures of the intake stroke and exhaust stroke are relatively constant due to the bleed air output and a lack of a waste gate in the exhaust.

Starting at point 0', the intake valves open with the piston in the cylinder at a top center position and the volume of the cylinder is at a minimum. As the piston moves from top center at point 0' to bottom center at point 1", an intake charge of fuel and air is forced into the cylinder at the output pressure of the turbocharger compressor, usually about 2 or more atmospheres of pressure, in the intake stroke. At point 1", the piston is at bottom center where the volume of the cylinder reaches its maximum and the intake valves close.

In a compression stroke, the piston moves from bottom center at point 1" to top center at point 2 as the fuel and air is compressed in the cylinder (e.g., pressure increases) because the intake and exhaust valves are closed and the volume is reduced. At point 2, the volume of the cylinder is again at a minimum.

An ignition of the compressed fuel and air also occurs at point 2. The ignition causes the compressed fuel and air to burn and generate a large pressure wave to increase the pressure in the cylinder to its peak value at point 3.

The piston is driven from top center at point 3 to bottom center at point 4 by the peak pressure during an expansion stroke. The volume of the cylinder increases from minimum to maximum during the expansion stroke. The exhaust valve opens at point 4 to open the cylinder to a lower pressure, coinciding with point 1".

The piston moves from bottom center at point 5 to top center at point 6 to force the exhaust gases out of the cylinder in an exhaust stroke. The volume of the cylinder decreases from maximum to minimum during the exhaust stroke.

The pressure at point 6, 0' is at the discharge pressure of the compressor, which is typically higher than atmospheric pressure. The intake valve opens at point 0' and the turbocharged four stroke cycle repeats.

A variable nozzle turbine (VNT) can be used to achieve a desired cooling capacity while maintaining boost levels with increased primary compressor power requirements during full air cycle machine operation by varying turbine power. This configuration can be designed to increase overall system efficiency by minimizing losses in the lower-loop sequence of operations through points 5, 6, 0' and 1", as described in FIG. 1.3 above, which is significant for minimizing fuel consumption. The lower-loop represents the net pumping losses induced on the engine by the exhaust and intake systems. The net power can be determined by integrating the P-v curve forward through the intake and exhaust strokes. The sum of the signed areas results in the net power consumed. An intake pressure greater than the exhaust backpressure will result in a negative pumping loss, or increased engine power as shown in FIG. 1.2. The VNT also demonstrates that a primary turbocharger can supply the necessary bleed airflow (ΔP greater than the intake pressure) to operate the air cycle machine effectively in a bleed-air configuration as shown in FIG. 1.3.

The air-cycle machine is based around the concept of a cooling turbine. This is the common component among all of the various air cycle machine configurations, such as the simple, two-wheel, or three-wheel bootstrap cycles. The air cycle machine turbine operates by providing a controlled expansion of air; an adiabatic, controlled expansion requires the air to do work on its boundaries to provide any cooling effect. The work done on the turbine wheel is transmitted by the shaft to an air cycle machine compressor or fan to utilize this power. The air cycle machine compressor and fan are methods of dissipating turbine power to do useful work in the system.

FIG. 2.1 is a schematic of a simple air cycle machine system 200, for implementing embodiments of the present disclosure. One advantage of using the simple air cycle machine system 200 is, as the name implies, simplicity. Minimized component numbers reduce complexity, weight and space requirements. The simple air cycle machine system 200 includes a jet engine 201, an heat exchanger 204 and an air cycle turbocharger 206.

Bleed air 202 is drawn from the jet engine 201 is typically in the range of 400-600° F. (200-315 degrees C.). The bleed air 202 passes through the heat exchanger 204. The heat exchanger 204 uses ram air 203 to cool the bleed air 202 down to as close to the ram air temperature as possible. The cooled bleed air 202' is input to a turbine 207 of the air cycle turbocharger 206 for expansion.

The turbine 207 produces power as the cooled bleed air 202' expands. The power produced by the turbine 207 is transmitted, by direct drive 208 (e.g., shaft) to a fan 209 of the air cycle turbocharger 206.

The power output from the turbine 207 corresponds to the enthalpy change in the cooled bleed air 202' passing through the turbine. There are two components to cooling the bleed air 202: 1) Heat rejection from the heat exchanger 204 and 2) Turbine power derived from the cooled bleed air 202' through the turbine 207 as the enthalpy and air temperature is reduced further to produce cool output air 202".

The fan 209 improves heat exchanger 204 effectiveness by increasing the ram air 203 flow over the cold side of the heat exchanger. Because the air cycle machine system 200 uses the fan 209 and does not rely only on ram air 203 for cooling the heat exchanger 204 allows the air cycle machine system to provide cooling while stationary or other times when ram air 203 flow would be minimal.

FIG. 2.2 is a schematic of a bootstrap air cycle machine system 230, for implementing embodiments of the present disclosure. The differences between the simple air cycle machine system 200 and the bootstrap air cycle machine system 230 include the use of an air cycle machine compressor 231, instead of the fan 209, and a second heat exchanger 232.

The bootstrap air cycle machine system 230 uses ram air 203 for cooling the heat exchangers 204, 232 and provides significantly lower temperature of the cooled air 233 output from the air cycle machine turbine 235 of the air cycle machine 234. The cooled air 233 temperature is low enough to have concerns about freezing the moisture out of the airflow. Although the ice does not form on the air cycle machine turbine 235 itself, ice can build up to an amount that restricts the cooled air 233 flow out of the output 235B of the air cycle machine turbine, thus reducing the pressure ratio from the input 235A to output 235B across the air cycle machine turbine and decreasing performance.

Bleed air 202 is drawn from one of the jet engine 201 and cooled through a primary heat exchanger 204, just as in the simple air cycle machine system 200. The cooled bleed air 202' enters the air cycle machine compressor 231. The air cycle machine compressor 231 increases the pressure of the cooled bleed air 202' to output compressed cooled bleed air 237. The power required by the air cycle machine compressor 231 to accomplish this task is provided by the air cycle machine turbine 235. The compressed cooled bleed air 237 exiting the air cycle machine compressor 231 is cooled by a second heat exchanger 232 before entering the air cycle machine turbine 235.

The air cycle machine turbine 235 receives the compressed cooled bleed air 237 at approximately the same temperature as in the simple air cycle machine system 200, but at a significantly higher pressure ratio across the air cycle machine turbine 235. The increased pressure ratio across the air cycle machine turbine 235 provides the work to deliver lower turbine discharge temperatures of the cooled air 233 flow out of the output 235B of the turbine than in the simple air cycle machine system 200.

A three-wheeled bootstrap air cycle machine system (not shown) differs from the bootstrap air cycle machine system 230 with the addition of a fan mounted on the same shaft as the air cycle machine compressor 231. The fan ensures adequate airflow on the cold side of the secondary heat exchanger 232. The fan consumes power from the air cycle machine turbine 235 and reduces the pressure ratio across the air cycle machine compressor 231.

The simple air cycle machine system 200 has few components, but the turbocharger compressor would be replaced by fan 209. This requires a significant amount of fabrication and does not use existing automotive turbocharger components. Using a fan mounted on the turbine shaft requires ducting that may be difficult to package in an automotive engine bay.

The three-wheel bootstrap air cycle machine system provides a nicely packaged rotating assembly. The issue with the three-wheel bootstrap air cycle machine system is manufacturing and balancing the complicated rotating assembly. The three-wheel bootstrap air cycle machine system requires extensive modification to a turbocharger.

The bootstrap air cycle machine system 230 requires more components, but the turbocharger 206 is a readily available, off the shelf, automotive component. An electric fan can be used to provide airflow over the secondary heat exchanger 232 at low vehicle speeds. This allows for simpler packaging in a small engine bay than ducting air from a remotely located fan.

The bootstrap air cycle machine system 230 provides the lowest turbine discharge temperature. In an automotive application the pressure ratios available are limited due to engine constraints and thus a lower pressure ratio will reduce the temperature drop across the turbine, assuming everything else remains constant.

FIG. 2.3 is a schematic of an internal combustion engine mounted two-wheel bootstrap air cycle machine system 250, for implementing embodiments of the present disclosure. The two-wheel bootstrap air cycle machine system 250 includes an internal combustion engine 251 and a turbocharger 252 turbine 253 coupled to the exhaust port 251B of the internal combustion engine. The turbocharger 252 compressor 254 is coupled to the turbine 253 by shaft 255.

The compressor 254 draws in fresh, ambient air 257 and outputs a compressed air 257'. The compressed air 257' is input to a first heat exchanger 258. The first heat exchanger 258 cools the compressed air 257' and outputs a cooled, compressed air 257" to the inlet 251A of the internal combustion engine 251. A first portion 262 of the cooled, compressed air 257" is consumed by the internal combustion engine 251 as a pressurized intake air. The first heat exchanger 258 is cooled by a cooling system 260. The cooling system 260 can be any suitable cooling system such as a circulating water cooling system or an air to air cooling system (e.g., a ram air source or a fan) and/or a portion of the expanded, cooled, cabin air 233 flow out of the output 235B of the air cycle machine turbine 235.

A second portion 263 of the cooled, compressed air 257" is bled from the output of the first heat exchanger 258 at a point 261. The bleed air configuration allows for control of intake manifold pressure or boost, a common name referring to intake manifold gauge pressure of the internal combustion engine 251.

Boost control is typically performed by using a pneumatic actuator that senses compressor outlet pressure and closes or opens a flapper valve (i.e., waste gate) located next to the turbine. This allows for a fraction of the exhaust gas to bypass the turbine, limiting turbine power and boost. It is referred to as "waste-gating" because any fraction of the exhaust that is allowed to bypass the turbine is wasted energy. The compressor bleed configuration uses this wasted energy to power the two-wheel bootstrap air cycle machine system 250 while preventing excessive boost.

The second portion 263 of the cooled, compressed air 257" is input to an air cycle machine compressor 231 of the air cycle machine 234. A valve 266 controls flow of the second portion 263 of the cooled, compressed air 257" into the air cycle machine compressor 231. The valve 266 can be fully open, fully closed or some intermediate setting for throttling the flow. A controller 265 is included in the system to control the air cycle machine. The controller 265 is coupled to the valve 266 to control the valve. The controller 265 can also be coupled to the internal combustion engine 251, the cooling systems 260, 264 and various other sensors and control points as may be desired.

The air cycle machine compressor 231 increases the pressure of the second portion 263 of the cooled, compressed air 257" to output compressed bleed air 237. The power required by the air cycle machine compressor 231 to accomplish this task is provided by the air cycle machine turbine 235. The compressed bleed air 237 exiting the air cycle machine compressor 231 is cooled by the second heat exchanger 232 before entering the air cycle machine turbine 235. The second heat exchanger 232 can be cooled by any suitable cooling system 264 such as a fan or a liquid media cooling system and/or a portion of the cooled air 233 flow out of the output 235B of the air cycle machine turbine 235.

The air cycle machine turbine 235 receives the cooled, compressed bleed air 237' at approximately the same temperature as in the simple air cycle machine system 200, but at a significantly higher pressure ratio across the air cycle machine turbine 235. The increased pressure ratio across the air cycle machine turbine 235 provides the work to deliver lower turbine discharge temperatures of the cooled air 233 flow out of the output 235B of the turbine than in the simple air cycle machine system 200.

The air cycle machine turbine 235 and air cycle machine compressor 231 match can be validated on a stand-alone test stand using compressed air supplied to the air cycle machine a shop air compressor system. As shown in FIG. 3.2 below.

Traditionally COP is defined as the ratio of cooling load compared to the power required to drive the system. This is a practical definition for most air conditioning systems where the compressor, dynamic or fixed-displacement, is driven from a motor or engine. The power, with an associated cost, going to the air conditioning system is easier to determine than that of the bleed air turbocharger-based system described herein since there is a physical connection between the motor and compressor.

$$COP_{traditional} = \frac{\dot{Q}_{cooling}}{\dot{W}_{compressor,fans}} \qquad \text{(Eqn. 2.1)}$$

This is not as clear when considering an air cycle machine powered by the engine's turbocharger. Not all of the power delivered to the air cycle machine has a cost associated with it. A portion of the power used to drive the primary compressor was from heat energy that would have been wasted through the exhaust or lost through waste-gating.

A new method for determining power consumption specifically by the air cycle machine is proposed. This can be done by finding the change in fuel flow rate with and without the air cycle machine operating and using brake-specific fuel consumption (bsfc) to calculate power used by the air cycle machine. This represents the effective power to drive the air cycle machine, in other words, only power that has an associated increase in fuel cost. This applies to air cycle machine operation outside of normal waste-gate operation to limit boost. Air cycle machine operation to limit boost levels instead of using the waste-gate has minimal impact on engine fuel consumption, lending to a significantly increased COP.

$$COP_{effective} = \frac{\dot{Q}_{cooling}}{\dot{W}_{Engine-ACM}} \qquad \text{(Eqn. 2.2)}$$

$$\dot{W}_{Engine-ACM} = \frac{\Delta \dot{m}_{fuel,ACM}}{bsfc} \qquad \text{(Eqn. 2.3)}$$

$COP_{effective}$ is not the only concern in air cycle machine design; the cooling capacity is the driving requirement in the design process. In optimizing the system, while meeting cooling capacity requirements, COP is maximized for a given set of ambient and air cycle machine inlet conditions. The effective COP and cooling capacity together are referred to as air cycle machine performance.

One alternative implementation is a two-wheel bootstrap air cycle machine system similar to the internal combustion engine mounted two-wheel bootstrap air cycle machine system 250 where the bleed air source at point 261 is replaced with an output of a supercharger that is driven from the engine 251. The supercharger feeds compressed air to the bootstrap air cycle machine. Instead of bleeding air from the engine intake manifold as done in internal combustion engine mounted two-wheel bootstrap air cycle machine system 250, the supercharger is dedicated to supplying air to the air cycle machine and serves no other function. This configuration somewhat decouples engine and air cycle machine operation, making it easier to control and quantify air cycle machine performance.

The dedicated supercharger based air cycle machine configuration has a severe shortcoming in that it will always be a parasitic power loss from the engine 251, rather than "free" power from the internal combustion engine mounted two-wheel bootstrap air cycle machine system 250.

The theoretical COP of the dedicated supercharger based air cycle machine configuration was 0.294, corresponding to the $COP_{traditional}$ defined above, while an optimized model showed a possibility of 0.62. This performance goal was not achieved due to excessively low efficiencies of the gearbox to drive the supercharger, poor heat exchanger performance, and excessively large turbocharger bearing losses. Overall, the fuel consumption of the engine in the dedicated supercharger based air cycle machine configuration was approximately three times greater with the air cycle machine operating. The dedicated supercharger based air cycle machine configuration testing did not show promising results.

The internal combustion engine mounted two-wheel bootstrap air cycle machine system 250 stands in stark contrast from the dedicated supercharger based air cycle machine configuration because there is energy available that would have been wasted during the turbine bypass process, wastegating, without the presence of the air cycle machine. Instead of wasting this energy, the energy can be utilized for powering the air cycle machine without any additional cost to the engine. This is essentially free cooling, or infinite COP. The internal combustion engine mounted two-wheel bootstrap air cycle machine system 250 allows increased upper limits of performance than the dedicated supercharger based air cycle machine configuration.

Air-cycle analysis can be performed assuming dry or moist air. The analysis for this project assumes dry air, except for using the dry-air rated (DAR) analysis for cooling capacity. DAR temperature is the equivalent temperature if the entrained water or ice in the air exiting the turbine is adiabatically evaporated. Dry air is assumed because, for most of the system, the difference in enthalpy change across components is minimal between the two methods. This, however, is not true for the turbine because the air temperature falls below that of the ambient conditions and moisture can drop out as a liquid, or possibly ice. This can have a significant impact in the enthalpy change across the turbine, affecting turbine power and discharge temperature.

The turbine-compressor matching process for a turbocharger-based air cycle machine configuration is different than that of a turbine-compressor match performed for an engine application. This is primarily due to the difference in turbine inlet conditions. Corrected parameters, such as flow and speed, for the turbine are dependent upon temperature. The turbine inlet temperature is significantly lower for an air cycle machine than typical exhaust gas temperatures of either diesel or gasoline engines. Commercial turbochargers are designed for engine applications, and thus a new compressor-turbine match is used to maximize performance in the air cycle machine application.

The differences in an on-engine application and the air cycle machine application become apparent when viewing a T-s diagram with both the Brayton and Reverse-Brayton cycles. The Brayton Cycle is modeling the engine as a heat input to the turbocharger system. FIG. 2.4 is a graph 270A of a Brayton cycle and a graph 270B of a Reversed Brayton cycle, for implementing embodiments of the present disclosure. The relative temperature and entropy changes are shown through each cycle 270A, 270B.

The process starts at the compressor inlet 271 and the volume decreases as the pressure increases. The Brayton Air-Standard Cycle is modeled with the engine as a continuous thermodynamic machine and with a mass-fraction bypassing the turbine to prevent over-pressurizing the intake. The intake air is then drawn into the engine. In the engine the intake air goes through the combustion process where the burned fuel adds heat to the flow before it is discharged into the exhaust manifold to the turbine inlet at point 272. The exhaust flow increases volume and decreases in pressure to point 273 as it expands through the turbine. A line connecting the compressor inlet at point 274 and the compressor outlet at point 275 represents the air possibly being recycled at some point and closes the cycle.

The Reversed Brayton Cycle 270B involves much less energy than compared to the Brayton Cycle 270A. This results in changes in corrected conditions for the compressor and turbine, lower compressor pressure ratios, and requires a somewhat different approach to the compressor-turbine matching process. A relatively larger compressor wheel proves to be a better match for reducing excessive corrected turbine speeds for maximizing turbine efficiency, while still keeping compressor efficiency in mind.

Reversed Brayton Cycle, is a thermodynamic refrigeration cycle which operates between two pressures: a lower isobar (typically atmospheric), and a higher isobar, determined by the cycle pressure ratio. The pressure ratio is the ratio of the two operating pressure points, high to low, measured on an absolute scale.

In this ideal cycle, the working gas, typically air, is compressed isentropically from the low isobar to the high isobar (point 4 to point 3). After this compression, the working gas is significantly hotter than at the compressor inlet. The gas is then cooled at constant pressure through a heat exchanger, points 3 to 2. The cooled working gas is then expanded through a cooling turbine, points 2 to 1, where the energy extracted from the expansion is used to power a fan (in the case of the simple air cycle machine), or to partially power the compression required from points 4 to 3 (bootstrap cycle).

FIG. 2.4, illustrates one implementation of the Reversed Brayton cycle, in conjunction with a turbocharger Brayton cycle. The turbo-compressor takes atmospheric air (point 274) and compresses it to point 275. The regular turbocharger Brayton cycle is shown in points 274, 275, 272 and 273. The Reversed Brayton cycle takes the hot compressed air at 275, passes it through a heat exchanger to point 271. The air is then compressed again to point 276, and then passed through a second heat exchanger, to point 277. Finally, the air is cooled through a cooling turbine which brings the gas state to point 278, where it may be introduced to the conditioned space.

There are a few things known about the system, as with many systems, such as mass balance, energy balance, and operating speeds of the compressor and turbine wheels. Assuming there are no leaks in the system, the mass flow rate through the compressor and turbine will be the same. With the assumption that the bearing losses are negligible, which is the case in most engine applications where the uncertainty of many other parameters outweigh this, the power output of the turbine will be matched by the compressor power requirement in steady-state operation. Considering the compressor and turbine wheels are directly mounted on the same shaft, the shaft speeds will be equal. Even with as many known parameters as there are, an iterative process can be used to find a mass, power, and speed balance because of the graphical nature of the compressor and turbine performance maps.

FIGS. 2.5 and 2.6 are graphs 280A, 280B of parametric studies of air cycle machine component efficiencies, for implementing embodiments of the present disclosure. Table 2.2 also provides data used to form the graphs 280A, 280B. Graph 280A shows a parametric study of air cycle machine component at 60 percent efficiencies. Graph 280B shows a parametric study of air cycle machine component at 80 percent efficiencies. With the results from the parametric study, attention can be given to the most critical components first. The analysis presented next shows that heat exchanger effectiveness (E_htxr2, FIGS. 2.5-2.6) and turbine efficiency (Eta_t2, FIGS. 2.5-2.6) are more significant to overall system performance than compressor efficiency. The data in the following figures are calculated assuming a primary compressor efficiency of 70% and ambient conditions similar to those found at the testing location. The compressor efficiency chosen is representative of attainable performance over a wide range in air flow in modern automotive turbocharger systems.

TABLE 2.1

Ambient conditions for theoretical performance model.

| Ambient Condition | |
|---|---|
| Temperature [Deg. F.] | 70 |
| Pressure [psia] | 14.69 |
| Relative Humidity [—] | 0.50 |

This analysis indicates that a minimum acceptable heat exchanger effectiveness is approximately 0.70 before rapidly decreasing overall air cycle machine performance. While compressor and turbine efficiencies remain constant, the curves for air cycle machine COP decrease by larger amounts as heat exchanger effectiveness decreases.

Using representative values from the previous analysis, attainable performance with automotive turbocharger components, for heat exchanger effectiveness, turbine efficiency, and compressor efficiency, the following table was constructed:

TABLE 2.2

Tabulated data from parametric study of performance analysis for a relative humidity of 50%.

| Pressure Ratio [—] | Heat Exchanger Effectiveness [—] | Turbine Efficiency [—] | Compressor Efficiency [—] | COP$_{DAR}$ [—] |
|---|---|---|---|---|
| 1.5 | 0.80 | 0.80 | 0.60 → 0.80 | 1.05 → 1.25 |
|  |  | 0.60 → 0.80 | 0.80 | 0.82 → 1.25 |
|  | 0.60 | 0.80 | 0.60 → 0.80 | 0.86 → 1.07 |
|  |  | 0.60 → 0.80 | 0.80 | 0.61 → 1.07 |

The turbine performance is more critical to the overall cycle performance. This is to be expected because the more efficient the turbine is, the more heat will be removed from the air expanding through the turbine, and the more power will be extracted to drive higher pressure ratios across the compressor. The higher pressure and temperature entering the heat exchanger allows more heat to be removed before entering the turbine. One limit to this cycle and a steady-state operating point because of the decreasing energy content in the air flow to the turbine as more heat is removed by the heat exchanger.

It should be noted that the air cycle machine in this testing is operated at the lower pressure ratio range due to boost limitations on the test engine and typical boost pressures for gasoline engines. The theoretical analysis is extended to the upper limits of pressure ratios that can be achieved by single stage compression. This is representative of what can be seen in operating intake pressures in diesel engines.

FIG. 3.1 shows a schematic of a compressed air source powered air cycle machine system 300, for implementing embodiments of the present disclosure. FIG. 3.2 is a photo of the compressed air source powered air cycle machine system 300, for implementing embodiments of the present disclosure. The compressed air source 301 includes a suitable compressor and sufficiently large air storage tanks. The compressed air source 301 stores the compressed air in air storage tanks at a relatively high pressure of about 125 psig. The air supplied to the inlet 302A of the heat exchanger 302 is regulated down to a nominal pressure of about 11 psig to represent the air cycle machine inlet conditions that will be similar to operation with the diesel engine. To represent realistic primary compressor performance in an on-engine turbocharger application, an isentropic compressor efficiency of 70% is assumed. This assumption applies to the following equation to calculate the air source compressor power requirements, solely for the purpose of COP estimation:

$$\dot{W}_C = \dot{m} c_p \frac{T_1}{\eta_c} \left[ PR_C^{\gamma-1/\gamma} - 1 \right] \tag{Eqn. 3.1}$$

This testing configuration allows for a baseline to be established with the unmodified, Garrett GT1241, turbocharger. Garret Turbochargers (Honeywell Turbo Technologies of Torrance, Calif.) manufactures a large range of turbocharger sizes and many combinations of compressors and turbines. The turbocharger base model selected has the smallest turbine in the product lineup, but it closely matches the requirements for this project. The next step is to optimize performance for an air cycle machine application, rather than a gasoline engine application. This involves sizing another compressor for the GT12 turbine.

Type-T thermocouples T1-T8 work well with the lower temperature range that the air cycle machine operations. In addition to this, the standard limit of error for type-T thermocouples is 1° C., compared to 2.2° C. for type-K. Each thermocouple was calibrated within the standard limit of error. All sensors were checked periodically between sets of experiments to ensure quality data.

This testing configuration gathered data for a baseline using an unmodified GT12 turbine-41 mm compressor wheel assembly for the air cycle machine and a GT12 turbine-44 mm compressor wheel assembly for improved efficiency. The larger compressor reduced corrected turbine speeds to improve performance. The 41 mm compressor wheel placed corrected turbine speed operating point off the high end of the turbine performance map. The compressor provided similar efficiency contours to the smaller compressor wheel, so there wasn't a significant decrease in performance on that end. The differences in the unmodified GT1241 and modified GT1244 compressor-turbine matches are due to the differences in the component inlet operating conditions for the intended applications, as discussed above.

The installation of the new compressor required manufacturing a shaft adapter due to a larger bore size in the larger compressor wheel. The specifications from Garrett Turbochargers indicated that bore inside-to-outside diameter runout and perpendicularity to the end faces need to be within 0.0001 inch. A shaft adapter was produced that met the acceptable vibration limits at peak operating speeds. This was verified before continuing with testing by slowly increasing the turbocharger speed, while directly measuring shaft speed and bearing housing vibration levels.

The procedure for performing the tests on both the unmodified GT1241 and modified GT1244 assemblies included: blowing out liquid water from the shop air lines and tanks, gathering local ambient conditions, and manually regulating the air cycle machine inlet pressure to achieve desired operating points and steady-state conditions before collecting each data set. Steady-state operating conditions can be detected and verified several ways, such as monitoring shaft speed, temperatures, and pressures.

The component that contributed most to the length of time required to reach steady state was the heat exchanger. The heat exchanger has a relatively large mass and used a significant time to reach a steady temperature. Steady-state conditions provide more accurate data collection because fictitiously high performance numbers can be observed. This is because of the thermal capacitance of the heat exchanger core and end caps. This thermal capacitance provides a second means of heat removal from the airflow until the heat exchanger is saturated with heat to a steady state. Once the heat exchanger is saturated with heat to a steady state, the only means of dissipating heat is to the cold air flow stream. Initial testing showed large apparent heat exchanger effectiveness during the transient period. All data was collected at steady-state conditions for this project, eliminating this effect.

The shop air stand testing demonstrated that the baseline GT1241 turbocharger provided an adequate compressor-turbine match, while the modified GT1244 turbocharger provided a larger useable air cycle machine operating range by increasing the efficiency over that range closer to the peak efficiency.

The on-engine configuration as shown schematically in FIG. 2.3 above uses the same air cycle machine test stand configuration with the exception of the compressor inlet being fed compressed air from the intake manifold of a diesel engine. This was achieved using a y-pipe after the primary heat exchanger (engine heat exchanger). The flow control valve 266 is located before the air cycle machine compressor inlet and is capable of turning the flow to the air cycle machine on or off and throttling flow.

The engine 251 used in this experiment is a six liter Perkins diesel engine. It is a four-stroke, inline six-cylinder engine. This choice of engine platform is relevant to sports car and racing applications because the engine displacement is similar, even though the speed range is lower. This is not necessarily a problem because the engine turbocharger's turbine is sized for the engine in consideration, and in the worst case, it will provide a lower limit for load and speed that the air cycle machine can be effectively operated. Since, in racing applications, the engine is typically at higher load and speed, this is not a concern.

The engine is fully-instrumented and is connected to a dynamometer. The engine-dynamometer setup is part of an engine class, and the sensors are calibrated. A calibration log is maintained, but even so, the sensors were verified to match their previous calibrations.

The Perkins diesel engine was first tested with the stock turbocharger to set a baseline for comparison of the new compressor for the primary, or engine, turbocharger. The air cycle machine compressor and air cycle machine turbine are sized to efficiently accommodate the additional air flow required for the operation of the engine and air cycle machine. The new turbocharger has a larger compressor and a variable nozzle turbine.

The experiments performed to assess the effects of air cycle machine operation on engine performance were conducted by running the engine at an operating point allowing maximum boost levels to be reached before opening the diverter valve to the air cycle machine. This demonstrates the effect of air cycle machine system air flow requirements on boost level available to the engine and change in fuel consumption, the two primary factors considered in a racing application.

FIG. 3.3 is a flowchart of the on-engine air cycle machine configuration operations 3300, for implementing embodiments of the present disclosure. The operations illustrated herein are by way of example, as it should be understood that some operations may have sub-operations and in other instances, certain operations described herein may not be included in the illustrated operations. With this in mind, the method and operations 3300 will now be described.

In an operation 3305 an intake fuel air mixture is delivered to the intake 251A of the internal combustion engine 251. The intake fuel air mixture allows the internal combustion engine 251 to operate and produce an exhaust gas charge 255 and output the exhaust charge from the exhaust port 251B, in an operation 3310.

The exhaust gas charge 255 is input to a turbine input 253A of a turbine 253 of a first turbocharger 252 in an operation 3315. The expanding exhaust gas charge 255 drives the turbine 253 and exits an outlet 253B of the turbine in an operation 3320.

As described above, the turbine 253 is coupled to the compressor 254 by shaft 255. As a result, the turning turbine 253 drives the compressor 254 via the shaft 255, in an operation 3325. In an operation 3330, the compressor 254 draws in air 257 and compresses the air. In an optional operation 3335, the compressed air 257' is cooled in a first heat exchanger 258. The first heat exchanger 258 is then cooled by first cooling system 260.

In an operation 3340 the compressed air 257' is divided into a first portion 262, a second portion 263 and an optional third portion and the first portion 262 is applied to the intake 251A of the engine 251. The first portion 262 increases the intake pressure of the engine 251 to above atmospheric pressure as described in FIG. 1.3 above.

In an operation 3345, the optional third portion can be vented off if not needed for further operations. In an operation 3350, the second portion 263 (e.g., bleed air) is directed through valve 266 to the air cycle machine 234. The second portion 263 is input to the air cycle machine compressor 231 and compressed in an operation 3355.

The compressed air 237 output of the compressor 231 is input to the second heat exchanger 232, in an operation 3360. The second heat exchanger 232 cools the compressed air 237 output of the air cycle machine compressor 231 in an operation 3365. The second cooling system 364 cools the second heat exchanger 232. It should be understood that the cooling systems 360, 364 can be a single cooling system or different cooling systems. It should also be understood that the cooling systems 360, 364 can be the same or different types of cooling systems (e.g., liquid coolant, air or any other suitable cooling media).

In an operation 3370, the cooled, compressed air 237' is input to the input 235A of air cycle machine turbine 235. In an operation 3375, the air cycle machine turbine 235 expands the cooled, compressed air 237' to further cool the air and outputs cooled air 233 in an operation 3380. The method operations can then end.

The matching process for the air cycle machine rotating assembly follows the method presented as described below, but there are some new considerations regarding the air cycle machine application. The turbine and compressors that are paired on production turbochargers are well-matched for gasoline or diesel engine applications, where there is hot exhaust gas driving the turbine. This temperature difference in the engine and air cycle machine applications causes a large change in corrected turbine speed and corrected mass flow rate, two parameters used to map turbine performance. Since the air cycle machine turbine inlet conditions will always be cooler than the original engine application, a larger compressor will be needed to reduce corrected turbine speeds. The compressor matching technique is essentially unchanged, since the compressor conditions are similar in both applications.

Resizing the primary engine turbocharger compressor was required to provide the additional airflow required during air cycle machine operation but still has a sufficient surge margin for safe engine operation. The method employed in sizing a new compressor for this project split the operating points symmetrically around the imaginary line that passes through the center of the efficiency contours up the map.

FIG. 3.4 is a graph 360A of the primary engine compressor matching process with an engine operating point of 1600 rpm and full load, for implementing embodiments of the present disclosure. Splitting the operating points around the peak efficiency line provides the best average efficiency if the air cycle machine was operated the same amount of time as it was off. This is not likely to be the case. However, since this project does not involve a specific application, the actual duty cycle is unknown and an exemplary 50 percent duty cycle is shown for discussion purposes. The split on the actual compressor match was not 50 percent due to available commercial compressor assemblies. Therefore, the nearest available compressor size was chosen. The primary compressor efficiency remains nearly constant whether or not the air cycle machine is operating by placing the operating point on each side of the nearest efficiency contour. There is opportunity for optimizing the compressor selection process, but detailed, application-specific data is required.

FIG. 3.5 is a graph 360B of the primary engine compressor match with the Perkins diesel boost curve and the target boost curve with the air cycle machine operating, for implementing embodiments of the present disclosure. The compressor selected for the Perkins diesel engine allows for full engine operation with and without the air cycle machine operating. This match provides a sufficient surge margin and low risk of compressor overspeed, while optimizing efficiency as much as possible for this project.

The unmodified GT1241 turbocharger was used as a performance baseline for comparison of modifications to the turbocharger, and it performed better than expected. FIGS. 4.1 and 4.2 are graphs 400A, 400B of the air cycle machine performance, for implementing embodiments of the present disclosure. An accurate prediction of performance was hard to obtain due to limited compressor and turbine performance data from the manufacturer. This is because the air cycle machine operating conditions, specifically turbine inlet temperature and pressure, caused an increase in corrected turbine speed, compared to an on-engine application. The air cycle machine operating conditions put the target corrected turbine speed outside of the known turbine performance map. However, the increased corrected turbine speed did not cause a sharp turbine efficiency drop, which was likely to occur due to excessive speed from the relatively small compressor.

FIG. 4.3 is a graph 400C of the primary heat exchanger performance, for implementing embodiments of the present disclosure. The limiting factor in this configuration was the primary heat exchanger as shown in FIG. 4.3. The relatively low heat exchanger effectiveness limited heat removal from the air entering the turbine. This is detrimental to performance as an increase in turbine inlet temperature will generally cause an increase in turbine outlet temperature, decreasing the cooling capacity of the air cycle machine.

The data points in FIGS. 4.1-4.3 were collected simultaneously, so the mass flow rate can be related to the air cycle machine pressure ratio, DAR COP, and DAR cooling capacity. For example, the third point from the right in FIG. 4.1 corresponds to the third point from the right in FIGS. 4.2-4.3. The cooling capacity required in a performance automotive application is approximately one ton of cooling.

The air cycle machine heat exchanger effectiveness was limited because of poor electric fan performance. The heat exchanger performance was shown to have a significant impact on overall air cycle machine performance. This limitation can be remedied by manually regulating compressed air to pass over the cold side of the heat exchanger or otherwise providing increased cooling air through the heat exchanger. The DAR COP has a peak because as the pressure ratio across the air cycle machine starts at unity and increases, both the air cycle machine compressor and turbine will pass through their respective peak efficiencies. The DAR cooling capacity will increase until both the compressor and turbine have passed their peak efficiencies and begin to decline in performance as the pressure ratio across the air cycle machine is further increased.

The peak dry air rated COP, with the 70% primary compressor efficiency assumption, is on par with a COP of the theoretical optimization of the dedicated supercharger based air cycle machine configuration, a COP of 0.62. However, the maximum cooling capacity does not occur at the maximum COP; the dry air rated COP falls to approximately 0.48 at that point.

FIGS. 4.4 and 4.5 are graphs 400D, 400E of the useful operating range of the air cycle machine, for implementing embodiments of the present disclosure. The initial testing of the GT1244 turbocharger used the same heat exchanger-fan assembly as the previous test to have a direct comparison of a single component change in the system. The change in the compressor wheel and housing did not change the peak dry air rated COP of the air cycle machine, but it did greatly expand the useful operating range of the air cycle machine and increase the system cooling capacity, pushing it closer to one ton of cabin cooling. The performance improvements from the compressor wheel and housing change from the unmodified GT1241 configuration are shown below.

FIG. 4.6 is a graph 400F of the heat exchanger effectiveness, for implementing embodiments of the present disclosure. The heat exchanger effectiveness is approximately the same as in the unmodified GT1241 testing. The heat exchanger is still a limiting factor. However, with its performance approximately the same as in the GT1241 air cycle machine testing, the results still show a relative improvement of the 44 mm compressor wheel over the previous 41 mm compressor wheel. The data points were collected simultaneously during this testing, and each point corresponds to the same data point number in the other plots in FIGS. 4.4-4.6.

Next, the heat exchanger cold-side airflow problem was corrected by routing manually-regulated compressed air over the cold side. The airflow over the cold side of the heat exchanger was kept within reasonable levels that could be obtained with a typical on-engine configuration seen in automotive applications. This was determined to be approximately 350 CFM, and this agrees with volumetric flow rates observed in R134a condensers. Based on heat exchanger cold flow entrance area, this results in an average air velocity of approximately 8.5 ft/s entering the face of the heat exchanger core. This is even easier to achieve when the vehicle would be moving. The results from the improved heat exchanger configuration can be seen below. FIGS. 4.7 and 4.8 are graphs 400G, 400H of the heat exchanger performance increase improved both air cycle machine COP and DAR cooling capacity, for implementing embodiments of the present disclosure. FIG. 4.9 is a graph 400I of the increase in heat exchanger effectiveness, for implementing embodiments of the present disclosure. The data points were collected simultaneously during this testing, and each point corresponds to the same data point number in the other plots in FIGS. 4.7-4.9.

The air cycle machine heat exchanger proved to be a significant component in overall air cycle machine performance. The improved heat exchanger effectiveness approximately doubled the dry air rated COP and cooling capacity.

The theoretical performance analysis was shown to be a good approximation of the actual performance of the air cycle machine. The flow prediction from the compressor-turbine match and the turbine pressure ratio-flow profile and actual flow conditions are over-plotted on the compressor performance map for the 44 mm compressor wheel. At lower pressure ratios, all measurements and corresponding predicted values agree within 7% difference or better. At higher pressure ratios across the air cycle machine the dry-air rated COP and DAR cooling capacity calculations both matched actual performance within approximately 13%, but the mass flow rate deviates more. The mass flow rate deviates up to 12% difference from the measured mass flow rate. At this point, the pressure ratio across the air cycle machine is approximately 1.84. FIG. 4.10 is a graph 400J of the results of the compressor operating points comparison, for implementing embodiments of the present disclosure. The DAR cooling capacity and DAR COP comparisons agree well and are shown in Table 4.2.

Since the selected operating parameters of the air cycle machine placed the operation of the air cycle machine at the outer limits of performance data collected by the turbocharger manufacturer, limited speed, power, and mass balance points could be obtained. If more component performance data was available, a more complete locus of operating points could be obtained with the computer simulation. Even with limited data, the part of the locus of operating points that was obtained from the computer simulation matches well with the experimental data. A comparison of the theoretical and actual operation using the conditions specified in Table 4.1 results in the performance presented in Table 4.2.

TABLE 4.1

Operating Conditions for single point comparison of theoretical and actual performance

| Ambient and Operating Conditions | Value | Units | Uncertainty [+/−] |
|---|---|---|---|
| Ambient Temperature | 531 | [Deg. R] | 1.7 |
| Ambient Pressure | 14.69 | [psia] | 0.02 |
| Ambient Relative Humidity | 0.4 | [—] | 0.08 |

TABLE 4.1-continued

Operating Conditions for single point comparison of theoretical and actual performance

| Ambient and Operating Conditions | Value | Units | Uncertainty [+/−] |
|---|---|---|---|
| ACM Compressor Inlet Temperature | 526 | [Deg. R] | 1.7 |
| ACM Compressor Inlet Pressure | 26.95 | [psia] | 0.02 |
| ACM Compressor Efficiency | 0.72 | [—] | 0.02 |
| ACM Compressor Outlet Pressure | 37.08 | [psia] | 0.02 |
| ACM Heat Exchanger Effectiveness | 0.83 | [—] | 0.04 |
| ACM Heat Exchanger Pressure Drop | 0.3 | [psi] | 0.03 |
| ACM Mass Flow Rate | 13.73 | [lbm/min] | 0.6 |
| ACM Turbine Inlet Temperature | 536 | [Deg. R] | 1.7 |
| ACM Turbine Efficiency | 0.56 | [—] | 0.02 |

TABLE 4.2

Results of single point comparison of theoretical and actual performance

| Performance Parameter | Theoretical Operation | Actual Operation | Uncertainty [+/−] |
|---|---|---|---|
| COP, Dry Air Rated [—] | 0.61 | 0.64 | 0.04 |
| Cooling Capacity, Dry Air Rated [ton] | 1.7 | 1.5 | 0.06 |

The on-engine testing was limited because of a bearing failure in the air cycle machine turbocharger. However, one operating point was tested before the failure occurred. The testing that was completed before failure was still a success with good performance. The COP based on change in bsfc and fuel flow rates indicated a COP of 0.56, with a corresponding 0.72 tons of cooling capacity. The theoretical optimization of the benchmarked dedicated supercharger based air cycle machine configuration had a COP of 0.62, while actual performance being much less. Their actual performance number was not stated, other than being less than expected. The COP for the on-engine testing for this project is assuming the air cycle machine is running at a time the engine's turbocharger would not have been wastegating, otherwise the COP is essentially infinite because the potential power would have been wasted in the turbine bypass free expansion process.

The testing conducted with the air cycle machine being powered by the Perkins diesel's turbocharger had reduced performance as compared to the shop air test stand. This is due to much higher air cycle machine inlet temperatures coming from the intake manifold of the engine. The on-engine testing conditions represent real world operation more accurately than the shop air test stand.

The target cooling capacity for the air cycle machine was determined by observing the average cooling capacity based on the Sanden performance charts of the SD5H09 R134a system compressors. This performance chart indicates the cooling capacity of a typical R134a system using the Sanden compressor. The cooling capacity will vary with suction superheat and operating pressures. The average range was selected from the Sanden chart to represent the target cooling capacity. This is approximately one ton of cooling capacity (12000 BTU/hr). The Sanden performance chart was used because Sanden is a worldwide manufacturer of automotive air conditioning compressors, used in all types of vehicles and would create a good approximation of the cooling requirements for a high-performance vehicle. While the GT1244 air cycle machine fell a little bit short of the cooling capacity goal, the R134a systems are pre-charge pressure and engine speed sensitive. Their actual capacity varies somewhat and are seldom used at full duty cycle at all times (i.e. cabin fan speed and temperature shutoff switch).

The system weight for a typical R134a system varies between 60-75 lbf. The air cycle machine system weight and estimated bracket weights totals at 40 lbf. This is approximately a 40% weight reduction. The physical size and number of components of the system is smaller than compared to R134a or Freon systems.

TABLE 4.3

Air Cycle Machine Component Weight Breakdown

| Component | Weight [lbf] |
|---|---|
| Turbocharger Assy. | 10 |
| Heat Exchanger Core | 10 |
| IC end caps | 4 |
| electric fan | 5.6 |
| ducting | 2.5 |
| Clamps | 1 |
| silicone connectors | 2 |
| Brackets (for vehicle) | 5 |
| Total | 40 |

Another aspect of the air cycle machine that differs from typical R134a air conditioning systems is that the air cycle machine does not always induce a parasitic loss on the engine crankshaft, as opposed to a belt-driven R134a compressor. This can be seen on the P-v diagram for a four-stroke engine in FIG. 1.2 above.

The lower loop on the P-v diagram is an indicator of the pumping losses on the engine. The pumping losses are the area under the exhaust line minus the area under the intake line in FIG. 1.2 or FIG. 1.3. It should be noted that in FIG. 1.3, the exhaust pressure is greater than the intake pressure. A positive lower-loop loss is typical of naturally-aspirated engines. In FIG. 1.2 the net pumping losses are negative, indicating that a forced-induction system is creating a higher engine intake manifold pressure than exhaust backpressure. Turning the R134a system compressor on will induce a load on the engine and always hurt engine performance. On the other hand, a turbocharger can actually create a higher intake pressure than exhaust back pressure. This is due to the turbine recovering wasted exhaust heat, with some exhaust backpressure, providing enough work to the compressor to deliver higher than exhaust pressures to the engine's intake manifold. This helps to minimize engine bsfc.

The shop-air stand testing successfully demonstrated that an air cycle machine can be designed around automotive turbocharger components. The use of automotive turbocharger components is critical to reducing cost in development of commercial systems for automotive use. An off-the-shelf turbocharger can be used in certain applications without modification and provide adequate performance. The testing on the unmodified GT1241 turbocharger indicated a peak DAR COP of approximately 0.38, and a DAR cooling capacity of 0.45 tons. The performance was somewhat limited due to the heat exchanger effectiveness initially, in the first two experiments of the GT1241 and GT1244, before the heat exchanger issue was remedied. It is expected that if the heat exchanger effectiveness was increased with this turbocharger configuration, the performance would be significantly increased, as seen in the modified GT1244 testing.

The GT1244 was optimized over the baseline GT1241 turbocharger. The air cycle machine turbine and compressor were selected for the air cycle machine operating conditions, as opposed to an on-engine application these turbochargers are normally used for. Initially, the peak DAR COP and DAR cooling capacity was approximately the same as the baseline GT1241 configuration. However, even with the heat exchanger performance being limited, the operating range was significantly increased (FIGS. 4.4-4.5). Once the heat exchanger effectiveness was increased by providing adequate airflow across the cold side of the heat exchanger core, the peak DAR COP reached 0.73 with a peak DAR cooling capacity of 1.5 tons (FIGS. 4.7-4.9). The DAR COP figures for the shop-air testing were determined by assuming a primary compressor efficiency of 70%. This primary compressor efficiency is typical of modern turbochargers in application. For reference, the compressor used for the on-engine testing in this project has an isentropic efficiency of 70%, or greater at the target boost pressure of 11 psig, over a mass flow range of approximately 16-32 lbm/min.

The on-engine testing has shown that an air-cycle air conditioning system can be effective for racing applications, where there is plenty of opportunity to take advantage of time that would have otherwise been spent waste-gating. The testing performed prior to the air cycle machine thrust bearing failure indicated a DAR COP of 0.56 and DAR cooling capacity of 0.72 tons. This operating point was not at full boost pressure due to the lower engine load and speed operating point initially tested, and the full benefit of the setup, operation during typical waste-gating conditions, could not be tested.

In comparison to the dedicated supercharger based air cycle machine configuration, the turbocharger based air cycle machine in this project performed well. The theoretical COP of the previous work was 0.294. They performed a theoretical optimization of the same system with an expected COP of 0.62. The theoretical optimization used compressor and turbine efficiencies of state-of-the-art components. However, their final results from actual testing were not presented other than a short statement saying that fuel consumption of the engine increased over three times the amount for the vapor-compression cycle they implemented as well. The group attributed the less-than-expected performance to excess losses in components such as the air cycle machine bearings and primary compressor on the engine.

If the air cycle machine bearing failure had not occurred, the next operating point would have been at higher load and speed to provide a better comparison to the waste-gated turbocharger operation. The operating point tested corresponds to a point where the stock turbocharger was not yet waste-gating. This means that the boost pressure can be increased to the original limit, resulting in increased cooling capacity due to increased pressure ratio across the air cycle machine. Also, the effects on engine performance can be decreased because the air cycle machine will be consuming a smaller fraction of the overall engine airflow. At larger engine loads and speeds, there is significant excess turbine power that would normally be limited by waste-gate operation. Factors that influence turbine power are turbine mass flow rate, exhaust gas temperature, and pressure ratio across the turbine. Both turbine mass flow rate and exhaust gas temperature typically increase with engine load and speed. With this in mind, engine operating points corresponding to waste-gate operation are expected to have increased DAR COP following the proposed definition of $COP_{Effective}$ in Eqn. 2.2.

The engine turbocharger matching criteria has potential to be further optimized for specific applications. This will minimize effects of air cycle machine operation on engine performance. The nominal air cycle machine mass flow rate relative to the engine mass flow rate at typical engine operating conditions is an significant consideration because too large of an air cycle machine and the primary compressor will not be able to maintain desired boost pressures at higher combined system mass flow rates. The air flow to the air cycle machine can be throttled, but this will reduce the potential cooling capacity of an air cycle machine being designed for the vehicle. While throttling the air cycle machine may be necessary is some engine operating conditions, it is not optimal for performance and should be avoided as much as possible.

The conditions the air cycle machine turbocharger compressor is operating in are similar to a second turbo in a series turbocharger setup used on modern diesel engines to more efficiently handle increased boost pressures. The main consideration is the bearing system for the air cycle machine. The bearing system experiences higher thrust loading because it needs a larger compressor wheel relative to the turbine wheel. This is because the compressor inlet sees higher than atmospheric pressures while the turbine still exits to ambient pressure, and with a larger compressor wheel, there is increased area for the inlet pressure to act upon. Stability of the rotating assembly is the first priority. However, the bearing system efficiency is increasingly critical in low-temperature applications because there is less power being transmitted by the shaft, and the same amount of bearing drag will now be a larger fraction of the power transmitted. To increase stability and decrease bearing losses, magnetic or air bearings may be considered.

The air cycle machine turbocharger can operate in a smaller range than an on-engine application, and this allows for more optimization of the compressor and turbine designs for higher peak efficiency at the cost of usable mass flow rate range. Once a particular application is well-defined, the compressor and turbine can be designed to operate in a narrower range that is adequate for the application.

The type of vehicle could be anything performance-oriented with a medium to large engine, due to the minimize size of turbochargers available for air cycle machine design. The turbocharger used for the air cycle machine in this project is the smallest commercially available from Garrett Turbochargers. The in-vehicle demonstration would allow for an operation duty-cycle to be recorded and facilitate in optimizing the engine turbocharger's compressor matching process.

Before beginning the cycle analysis, compressor and turbine performance maps are needed from the manufacturer. These maps provide the isentropic efficiency of the components over their operating range. Obtaining a good turbine-compressor match is a critical step in achieving minimum turbine discharge temperatures. FIG. 5.1 is a graph 500A of a GT1244 compressor performance map, for implementing embodiments of the present disclosure. FIG. 5.2 is a graph 500B of a GT1244 turbine performance map, for implementing embodiments of the present disclosure.

To start the compressor-turbine analysis, start with the compressor first because the compressor performance map will define a corrected compressor speed based on the pressure ratio and corrected compressor flow rate. One can assume values for corrected compressor flow rate and pressure ratio. Using these assumed values the compressor map will provide compressor speed and isentropic efficiency. Using Eqn. 5.1, the required compressor power can be calculated.

$$\dot{W}_C = \dot{m}c_p \frac{T_1}{\eta_c}[PR_C^{\gamma-1/\gamma} - 1] \qquad \text{(Eqn. 5.1)}$$

The next step is to convert corrected quantities to physical quantities, such as compressor mass flow rate and speed. These can be modified to the actual operating conditions by the following equations.

The compressor outlet temperature can be determined using the known or assumed compressor inlet temperature, compressor pressure ratio, and compressor efficiency.

$$W_c = W_c^* \frac{\sqrt{T_{1c}/545}}{P_{1c}/28.4} \qquad \text{(Eqn. 5.2)}$$

$$N_c = N_c^* \sqrt{T_{1c}/545} \qquad \text{(Eqn. 5.3)}$$

The compressor outlet temperature can be determined using the known or assumed compressor inlet temperature, compressor pressure ratio, and compressor efficiency.

The next component after the compressor will be the heat exchanger, followed by the turbine. There will be a pressure drop across the heat exchanger. Typical values can be assumed for the pressure drop and effectiveness, unless actual heat exchanger data is available. In this project, engineering data on the heat exchanger was not available, so the pressure drop was assumed to be 1 psi and effectiveness to be 0.80. From this, turbine inlet pressure and temperature can be found.

$$T_2 = T_1 + \frac{T_1}{\eta_c}[PR_C^{\gamma-1/\gamma} - 1] \qquad \text{(Eqn. 5.4)}$$

The next component after the compressor will be the heat exchanger, followed by the turbine. There will be a pressure drop across the heat exchanger. Typical values can be assumed for the pressure drop and effectiveness, unless actual heat exchanger data is available. In this project, engineering data on the heat exchanger was not available, so the pressure drop was assumed to be 1 psi and effectiveness to be 0.80. From this, turbine inlet pressure and temperature can be found.

The turbine outlet pressure can be assumed to be the ambient pressure. The turbine pressure ratio can be found from the following equation.

$$P_{1T} = P_{2C} - \Delta P_{HTXR} \qquad \text{(Eqn. 5.5)}$$

$$T_{1T} = T_{2C} - e(T_{2C} - T_{amb}) \qquad \text{(Eqn. 5.6)}$$

The turbine outlet pressure can be assumed to be the ambient pressure. The turbine pressure ratio can be found from the following equation.

$$PR_T = P_{1T}/P_{2T} \qquad \text{(Eqn. 5.7)}$$

To acquire data from the turbine performance map, corrected turbine mass flow rate and speed are required. These can be found from the following equations.

$$W_T^* = \frac{W_T \sqrt{T_{1T}/519}}{P_{1T}/29.92}$$ (Eqn. 5.8)

$$N_T^* = \frac{N_T}{\sqrt{T_{1T}/519}}$$ (Eqn. 5.9)

Turbine efficiency can be found from the turbine performance map at this point, and turbine power can be found using the following equation. The corrected turbine mass flow rate falls on the flow lines on the turbine performance map, and if they do not, conservation of mass is not satisfied. Iteration with new assumed values is required.

$$\dot{W}_{out} = \dot{m} c_p T_1 \eta_T \left[ \frac{PR_T^{\gamma-1/\gamma} - 1}{PR_T^{\gamma-1/\gamma}} \right]$$ (Eqn. 5.10)

Once this is complete the turbine power generation can be compared to the compressor power consumption. They should be relatively close, within a tolerance determined by the engineer. If not, a new corrected compressor mass flow rate and pressure ratio can be selected and repeat this process until mass, power, and speed are balanced.

NOMENCLATURE $P_{1C}$ Compressor inlet pressure
$P_{2C}$ Compressor discharge pressure
$P_{1T}$ Turbine inlet pressure
$P_{2T}$ Turbine discharge pressure
$T_{1C}$ Compressor inlet temperature
$T_{2C}$ Compressor discharge temperature
$T_{1T}$ Turbine inlet temperature
$T_{2T}$ Turbine discharge temperature
$PR_C$ Compressor pressure ratio
$PR_T$ Turbine pressure ratio
$c_p$ Specific heat capacity
$N_C$ Physical compressor speed
$N_C^*$ Corrected compressor speed
$N_T$ Physical turbine speed
$N_T^*$ Corrected turbine speed
$W_C$ Physical compressor mass flow rate
$W_C^*$ Corrected compressor mass flow rate
$W_T$ Physical turbine mass flow rate
$W_T^*$ Corrected turbine mass flow rate
$\dot{W}_C$ Compressor Power
$\dot{W}_T$ Turbine Power
R Gas constant
$\bar{R}$ Universal gas constant
M Molecular weight
h Specific enthalpy

GREEK

γ Ratio of specific heats

ACRONYMS

ACM Air-cycle machine
BSFC Brake specific fuel consumption
CFM Cubic feet per minute
DAR Dry air rated
SCFM Standard cubic feet per minute
LFE Laminar flow element
CHRA Center housing rotating assembly
CI Compression ignition
SI Spark ignition
COP Coefficient of performance
VE Volumetric efficiency
EGT Exhaust gas temperature FIG. 6.1 is a schematic of an internal combustion engine mounted two-wheel bootstrap air cycle machine system 6100, for implementing embodiments of the present disclosure. The two-wheel bootstrap air cycle machine system 6100 includes a compressor 254 having an input open to the ambient atmosphere and an output coupled to a first heat exchanger 258. The compressor 254 draws in ambient air 257 and compresses the ambient air to produce a compressed air 257'.

The first heat exchanger 258 includes a cooling circuit coupled to a cooling system 260. The first heat exchanger 258 cools the compressed air 257' output from the compressor 254 by transferring a portion of the heat energy in the compressed air 257' to a coolant provided by the cooling system 260 to produce a cooled, compressed air 257". The cooled, compressed air 257" is output from the first heat exchanger 258.

A first portion of the cooled, compressed air 257" can be input as an intake air to the intake 251A of an internal combustion engine 251. The internal combustion engine can produce an exhaust charge 255 that can be used to drive the turbocharger turbine 253. The turbocharger turbine 253 is mechanically coupled to the compressor 254 e.g., by a shaft 255, in one implementation. It should also be understood that the compressor 254 can be driven mechanically directly from a mechanical drive output of the internal combustion engine 251 such as what is commonly known as a mechanically driven supercharger using a belt, gears, chain or other commonly known methods of transferring mechanical drive, and combinations thereof, from the internal combustion engine to the compressor 254.

A second portion 263 of the cooled, compressed air 257" can be directed through a valve 266 to an inlet of an air cycle machine compressor 231. The air cycle machine compressor 231 is mechanically coupled to an air cycle machine turbine 235. As illustrated, the air cycle machine compressor 231 can be mechanically coupled to the air cycle machine turbine 235 by a shaft 236, however it should be understood that other methods of coupling the air cycle machine turbine and the air cycle machine compressor can be used. By way of example, the air cycle machine compressor 231 can be mechanically coupled to the air cycle machine turbine 235 by one or more of gears, chain, pulley or a belt or any other suitable mechanical coupling for coupling the rotation of the second turbine to the second compressor.

The air cycle machine compressor 231 includes an outlet coupled to a second heat exchanger 232. The air cycle machine compressor 231 compresses the second portion 263 of the cooled, compressed air 257" to produce a compressed bleed air 237. The air cycle machine compressor 231 outputs the compressed bleed air 237 to the second heat exchanger 232.

The second heat exchanger 232 includes a cooling circuit coupled to a cooling system 264. The second heat exchanger 232 cools the compressed bleed air 237 output from the air cycle machine compressor 231 by transferring a portion of the heat energy in the compressed bleed air 237 to a coolant provided by the cooling system 264 to produce a cooled, compressed bleed air 237'.

The cooled, compressed bleed air 237' outlet of the second heat exchanger 232 is coupled to an inlet 235A of the air cycle machine turbine 235. The second heat exchanger 232 outputs the cooled, compressed bleed air 237' to the air cycle machine turbine 235. The air cycle machine turbine 235 further cools the cooled, compressed bleed air 237' through expansion. The cooled, compressed bleed air 237' expands in and drives the air cycle machine turbine 235 to produce an expanded, cooled, cabin air 233. Driving the air cycle machine turbine 235 also drives the air cycle machine compressor 231.

The air cycle machine turbine 235 includes an outlet 235B that is coupled to a selection of valves 604A-D. The valves 604A-D are coupled to the controller 265 so that the controller can control the operation of the valves. The valves 604A-D provides the ability to selectively direct the expanded, cooled, cabin air 233. The valves 604A-D can be included in a single valve body or in a manifold assembly or combinations thereof. Each one or more of the valves 604A-D can be fully open, fully closed or some intermediate setting for throttling the flow of the expanded, cooled, cabin air 233. In one implementation, opening valve 604A directs at least a portion of the expanded, cooled, cabin air 233 to a cooled space 602. The cooled space 602 can include a passenger cabin or other refrigerated volume such as a refrigerated cargo space.

In another implementation, opening valve 604B directs at least a portion of the expanded, cooled, cabin air 233 to the coolant circuit of the second heat exchanger 232. By way of example, if the second heat exchanger 232 is an air to air heat exchanger that uses the ambient air as a coolant or cooling media, then the expanded, cooled, cabin air 233, can drastically reduce the temperature of the air used as the coolant or cooling media in the second heat exchanger 232. As a result, the second heat exchanger 232 can achieve a greater temperature differential when cooling the compressed bleed air 237 as compared to using only the ambient air as a coolant or cooling media.

In another implementation, opening valve 604C directs at least a portion of the expanded, cooled, cabin air 233 to the coolant circuit of the first heat exchanger 258. By way of example, if the first heat exchanger 258 is an air to air heat exchanger that uses the ambient air as a portion of the coolant or cooling media, the expanded, cooled, cabin air 233, can drastically reduce the temperature of the air used as the coolant or cooling media in the first heat exchanger 258. As a result, the first heat exchanger 258 can achieve a greater temperature differential when cooling the compressed bleed air 237 as compared to using only the ambient air as a coolant or cooling media. In another implementation, opening valve 604D directs at least a portion of the expanded, cooled, cabin air 233 to the ambient atmosphere if the portion of the expanded, cooled, cabin air is not needed for one of the other three purposes discussed above.

FIG. 6.2 is a flowchart of the method operation 6200 of the two-wheel bootstrap air cycle machine system 6100, for implementing embodiments of the present disclosure. The operations illustrated herein are by way of example, as it should be understood that some operations may have sub-operations and in other instances, certain operations described herein may not be included in the illustrated operations. With this in mind, the method and operations 6200 will now be described.

In an operation 6205, ambient air is drawn into and compressed by the compressor 254. Ambient air is typically at atmospheric pressure of 1 atm and with an ambient temperature of between about 10 degrees C. and about 50 degrees C. The compressor 254 compresses the ambient air into compressed air 257' having a pressure of between about 1.5 atm to about 4 atm and at temperatures up to about 150 degrees C. Typically, the compressed air 257' has a pressure of between about 1.5 atm and about 3 atm and a temperature of between about 70 degrees C. and about 100 degrees C.

In an operation 6210, the compressed air 257' is input to a first heat exchanger 258 where the compressed air 257' is cooled to produce cooled, compressed air 257". The first heat exchanger 258 can be an air to air heat exchanger using the ambient air as a coolant. Other coolants could also be used in addition to or instead of the ambient air. The first heat exchanger 258 cools the compressed air 257' by transferring some of the heat energy in the compressed air 257' to the coolant or cooling media circulated by the cooling system 260. The first heat exchanger 258 typically has a temperature differential of about 55 degrees C. in that the temperature of the compressed air 257' on the inlet of the first heat exchanger is about 55 degrees C. higher than the temperature of the cooled, compressed air 257" at the outlet of the first heat exchanger.

In an operation 6211, a first portion of the cooled, compressed air 257" is delivered to the intake 251A of the internal combustion engine 251. In an operation 6215, a second portion of the cooled, compressed air 257" is delivered through valve 266 to the inlet of the air cycle machine compressor 231, where the second portion of the cooled compressed air 257" is compressed to produce compressed bleed air 237. The air cycle machine compressor 231 has a compression ratio of between about 2 to 1 and about 3 to 1. The compressed bleed air 237 has a pressure of between about 1.5 atm and about 4 atm and a temperature up to about 150 degrees C. Typically, the compressed bleed air 237 as a pressure of between about 1.5 atm and about 3 atm and a temperature of between about 70 degrees C. and about 100 degrees C.

In an operation 6220, the compressed bleed air 237 is input to and cooled by a second heat exchanger 232 to produce cooled, compressed bleed air 237'. The second heat exchanger 232 can be an air to air heat exchanger using the ambient air as a coolant. Other coolants could also be used in addition to or instead of the ambient air. The second heat exchanger 232 cools the compressed bleed air 237 by transferring some of the heat energy in the compressed bleed air 237 to the coolant or cooling media circulated by the cooling system 264. The second heat exchanger 232 typically has a temperature differential of about 55 degrees C. in that the temperature of the compressed bleed air 237 on the inlet of the second heat exchanger is about 55 degrees C. higher than the temperature of the cooled, compressed bleed air 237' at the outlet of the second heat exchanger. The cooled, compressed bleed air 237' as a temperature of between about 35 degrees C. and about 100 degrees C.

In an operation 6225, the cooled, compressed bleed air 237' is input to and expanded by the air cycle machine turbine 235. The air cycle machine turbine 235 expands and further cools the cooled compressed bleed air 237' to produce the expanded, cooled, cabin air 233. The expanded, cooled, cabin air 233 has a temperature of between about 0 degrees C. and about 5 degrees C. and a pressure of less than about 1.5 atm.

In an operation 6230, a first portion of the expanded, cooled, cabin air 233 is output to a conditioned space such as a passenger cabin or refrigerated cargo space, through valve 604A. However at certain times when the condition space is that the desired cooled temperature or at times when the expanded, cooled, cabin air 233 could be used elsewhere more efficiently.

In an optional, alternative or additional operation 6240, a second portion of the expanded, cooled, cabin air 233 can be directed toward the first heat exchanger 258 or the second heat exchanger 232 as a portion of or in addition to other coolants and cooling media. The second portion of the expanded, cooled, cabin air 233 can be directed toward the first heat exchanger 258 or the second heat exchanger 232 through corresponding valves 604B and 604C. Directing the second portion of the expanded, cooled, cabin air 233 to the first heat exchanger 258 or the second heat exchanger 232 can increase the temperature differential across the corresponding heat exchanger. By way of example, directing the expanded, cooled, cabin air 233 to the first heat exchanger 258 can result in reducing the temperature of the cooled, compressed air 257" to less than ambient air temperatures. This less than ambient air temperature, cooled compressed air 257" can increase the efficiency of the internal combustion engine 251. As a result, at times of greater power needs from the internal combustion engine 251, e.g., pulling a heavy load, accelerating, climbing a grade, etc., diverting a portion of the expanded, cooled, cabin air 233 to the first heat exchanger 258 can result in more optimum performance of the overall system.

In an optional, alternative or additional operation 6250, a third portion of the expanded, cooled, cabin air 233 can be vented to the ambient atmosphere if it is not needed for any other purpose.

In the various embodiments described herein, the air cycle machine 234 can utilize energy produced by an internal combustion engine or other sources that is typically disposed of as waste and instead use it for very constructive purposes and even to increase the efficiency of the internal combustion engine. Further as described herein, the air cycle machine 234 can provide cooling air at virtually no cost in power to the internal combustion engine 251 in sharp contrast with a common, mechanically driven refrigeration system by using energy that is typically disposed as waste by the internal combustion engine.

Although the foregoing embodiments have been described in some detail for purposes of clarity of understanding, it will be apparent that certain changes and modifications may be practiced within the scope of the appended claims. Accordingly, the present embodiments are to be considered as illustrative and not restrictive, and the disclosed embodiments are not to be limited to the details given herein, but may be modified within the scope and equivalents of the appended claims.

What is claimed is:

1. A method of producing cooled air comprising:
    driving a first turbine by an exhaust of an internal combustion engine, the first turbine being mechanically coupled to and driving a first compressor;
    outputting compressed air from the first compressor;
    delivering at least a first portion of the compressed air into an inlet of an air cycle machine compressor, the air cycle machine compressor being mechanically coupled to an air cycle machine turbine;
    compressing the first portion of the compressed air in the air cycle machine compressor to produce a compressed bleed air;
    delivering the compressed bleed air to an inlet of a first heat exchanger;
    delivering a first cooling media to the first heat exchanger;
    cooling the compressed bleed air in the first heat exchanger to produce a cooled, compressed bleed air at an outlet of the first heat exchanger;
    driving the air cycle machine turbine with the cooled, compressed bleed air including:
        delivering the cooled, compressed bleed air to the inlet of the air cycle machine turbine; and
        expanding the cooled, compressed bleed air in the air cycle machine turbine to produce an expanded, cooled cabin air; and
    outputting a first portion of the expanded, cooled cabin air to a conditioned space including at least one of a passenger cabin or a refrigerated cargo space.

2. The method of claim 1, further comprising delivering a second portion of the expanded, cooled cabin air to the first heat exchanger as at least a portion of the first cooling media.

3. The method of claim 1, further comprising:
    drawing ambient air into an inlet of the first compressor;
    compressing the ambient air in the first compressor to produce the compressed air at an outlet of the first compressor;
    wherein outputting compressed air from the first compressor includes:
        delivering the compressed air to an inlet of a first heat exchanger;
        delivering a first cooling media to the first heat exchanger; and
        cooling the compressed air in the first heat exchanger to produce a cooled, compressed air at an outlet of the first heat exchanger, wherein the first portion of the compressed air delivered into the inlet of the air cycle machine compressor is included in the cooled, compressed air output from the outlet of the second heat exchanger.

4. The method of claim 3, further comprising cooling at least one of the compressed air in the first heat exchanger or the compressed bleed air in the first heat exchanger with a second portion of the expanded, cooled cabin air.

5. The method of claim 3, further comprising outputting a second portion of the expanded, cooled cabin air as at least a portion of at least one of the first cooling media or the second cooling media.

6. The method of claim 1, wherein the first turbine includes an inlet coupled to an internal combustion engine exhaust port of the internal combustion engine.

7. The method of claim 1, further comprising delivering a first portion of the cooled, compressed air into an internal combustion engine inlet of the internal combustion engine.

8. A method of producing cooled air comprising:
    delivering a first portion of a cooled, compressed air into an inlet of an air cycle machine compressor, the air cycle machine compressor being mechanically coupled to an air cycle machine turbine;
    compressing the first portion of the cooled, compressed air in the air cycle machine compressor to produce a compressed bleed air;
    delivering the compressed bleed air to an inlet of a first heat exchanger;
    delivering a first cooling media to the first heat exchanger;
    cooling the compressed bleed air in the first heat exchanger to produce a cooled, compressed bleed air at an outlet of the first heat exchanger;
    driving the air cycle machine turbine with the cooled, compressed bleed air including:
        delivering the cooled, compressed bleed air to the inlet of the air cycle machine turbine; and
        expanding the cooled, compressed bleed air in the air cycle machine turbine to produce an expanded, cooled cabin air, wherein the expanded, cooled cabin air has a temperature of between about 0 and about 10 degrees C. at the outlet of the air cycle machine turbine; and outputting a first portion of the expanded, cooled cabin air to a conditioned space including at least one of a passenger cabin or a refrigerated cargo space.

9. A refrigerated air generation system comprising:
a compressed air source;
an air cycle machine compressor, the air cycle machine compressor being mechanically coupled to an air cycle machine turbine, the air cycle machine compressor having an inlet coupled to an outlet of the compressed air source for receiving compressed air from the compressed air source;
a first heat exchanger including:
an inlet coupled to an outlet of the air cycle machine compressor;
a cooled bleed air outlet; and
a first cooling circuit coupled to a first cooling system;
an air cycle machine turbine for expanding the cooled, bleed air, the air cycle machine turbine including:
an inlet coupled to the cooled bleed air outlet of the first heat exchanger;
an expanded, cooled, cabin air outlet;
a plurality of valves coupled to the expanded, cooled, cabin air outlet of the air cycle machine turbine including:
a first valve of the plurality of valves being coupled to and for directing at least a first portion of an expanded, cooled, cabin air from the air cycle machine turbine outlet to at least one of a passenger cabin or a refrigerated cargo space; and
a second valve of the plurality of valves being coupled to and for directing at least a second portion of an expanded, cooled, cabin air from the air cycle machine turbine outlet to the second cooling circuit.

10. The system of claim 9, further comprising:
a first heat exchanger disposed between the compressed air source and the air cycle machine compressor, the first heat exchanger for cooling the compressed air output from the compressed air source, the first heat exchanger including:
an inlet coupled to the outlet of the compressed air source;
a cooled compressed air outlet coupled to the inlet of the air cycle machine compressor; and
a first cooling circuit coupled to a second cooling system.

11. The system of claim 10, further comprising a third valve of the plurality of valves being coupled to and for directing at least a third portion of the expanded, cooled, cabin air from the air cycle machine turbine outlet to the first cooling circuit.

12. The system of claim 10, further comprising an internal combustion engine and wherein the cooled compressed air outlet of the first heat exchanger is coupled to an inlet of the internal combustion engine in addition to the inlet of the air cycle machine compressor.

13. The system of claim 12, wherein the compressed air source includes a compressor having an inlet coupled to an ambient atmosphere and the compressor is driven by the internal combustion engine.

14. The system of claim 12, wherein the compressed air source includes a compressor having an inlet coupled to an ambient atmosphere and the compressor is driven by a turbine coupled to and driven by an exhaust port of the internal combustion engine.

\* \* \* \* \*